(12) United States Patent
Curray et al.

(10) Patent No.: US 7,447,762 B2
(45) Date of Patent: Nov. 4, 2008

(54) ETHERNET COMMUNICATIONS FOR POWER MONITORING SYSTEM

(76) Inventors: Timothy G. Curray, 5900 Halls Hill Pike, Murfreesboro, TN (US) 37130; Bradley A. Lazenby, 2648 Brookrun Rd., Murfreesboro, TN (US) 31729

( * ) Notice: Subject to any disclaimer, the term of this patent is extended or adjusted under 35 U.S.C. 154(b) by 872 days.

(21) Appl. No.: 09/824,493

(22) Filed: Apr. 2, 2001

(65) Prior Publication Data
US 2003/0084112 A1 May 1, 2003

(51) Int. Cl.
*G06F 15/173* (2006.01)
(52) U.S. Cl. .................. 709/224; 709/223; 702/61
(58) Field of Classification Search ......... 709/223–226; 370/245, 252, 254, 401, 445; 700/60, 61, 700/62, 64, 65, 79, 176, 180, 187, 188
See application file for complete search history.

(56) References Cited

U.S. PATENT DOCUMENTS

| | | | | |
|---|---|---|---|---|
| 5,768,148 A * | 6/1998 | Murphy et al. | ............... | 700/286 |
| 5,862,391 A * | 1/1999 | Salas et al. | ................... | 713/300 |
| 6,105,093 A * | 8/2000 | Rosner et al. | ............... | 710/105 |
| 6,178,362 B1 * | 1/2001 | Woolard et al. | ............. | 700/295 |
| 6,272,552 B1 * | 8/2001 | Melvin et al. | ............... | 709/250 |
| 6,298,376 B1 * | 10/2001 | Rosner et al. | ............... | 709/209 |
| 6,301,527 B1 * | 10/2001 | Butland et al. | ............. | 700/286 |
| 6,321,272 B1 * | 11/2001 | Swales | ........................ | 709/250 |
| 6,535,983 B1 * | 3/2003 | McCormack et al. | ....... | 713/310 |
| 6,553,418 B1 * | 4/2003 | Collins et al. | ............... | 709/224 |
| 6,587,884 B1 * | 7/2003 | Papadopoulos et al. | ..... | 709/230 |
| 6,618,709 B1 * | 9/2003 | Sneeringer | .................. | 705/412 |
| 6,640,308 B1 * | 10/2003 | Keyghobad et al. | ......... | 713/300 |
| 6,671,635 B1 * | 12/2003 | Forth et al. | .................... | 702/61 |
| 6,714,977 B1 * | 3/2004 | Fowler et al. | ............... | 709/224 |
| 6,762,675 B1 * | 7/2004 | Cafiero et al. | ............ | 340/10.42 |
| 6,792,337 B2 * | 9/2004 | Blackett et al. | ............. | 700/295 |
| 6,961,641 B1 * | 11/2005 | Forth et al. | .................. | 700/295 |
| 7,181,517 B1 * | 2/2007 | Iavergne et al. | ............. | 709/224 |
| 7,327,558 B2 * | 2/2008 | Kennedy et al. | ............ | 361/668 |
| 2003/0226050 A1 * | 12/2003 | Yik et al. | ..................... | 713/324 |
| 2004/0024717 A1 * | 2/2004 | Sneeringer | .................. | 705/412 |

OTHER PUBLICATIONS

"Powerlogic® Advanced Power Reliability Solutions," Square D Schneider Electric, brochure, 2000, 3 pages doublesided.
"Powerlogic® Circuit Monitor—Series 2000," Class 3020, Square D Schneider Electric, brochure, 3 pages doublesided.
"Powerlogic® Power Meter," Class 3020, Square D Schneider Electric, brochure, 1998, 2 pages doublesided.
"Powerlogic® Metering & Monitoring Devices," Square D Schneider Electric, brochure, 2000, 2 pages doublesided.
"Powerlogic® Power Monitoring and Control System," Square D Schneider Electric, brochure, 1998, 4 pages doublesided.
"Powerlogic® Series 4000 Circuit Monitor," Square D Schneider Electric, brochure, 2000, 3 pages doublesided.
"Digest," Square D Schneider Electric, product catalog, Mar. 2000, 10 pages.

* cited by examiner

*Primary Examiner*—Lashonda T Jacobs

(57) ABSTRACT

An Ethernet communications system for a power monitoring system includes an Ethernet communications device having a processor, a communications interface capable of gathering, under control of the processor, real-time information from one or more slave devices. The processor and communications interface are operative for presenting the real-time information in a format useable by Hypertext Markup Language (HTML) pages.

25 Claims, 8 Drawing Sheets

US 7,447,762 B2

ETHERNET COMMUNICATIONS FOR POWER MONITORING SYSTEM

BACKGROUND OF THE INVENTION

This invention is directed generally to the power monitoring arts, and more particularly, to an Ethernet communication system for use with a power monitoring device.

While the invention may find other uses, the embodiment described herein is configured for use with a POWERLOGIC® power monitoring and control system which combines microprocessor-based instrumentation and control with internet software to provide information from an electrical distribution system. The system has such capabilities as alarm reporting, automatic control, high-accuracy instrumentation, power quality and disturbance monitoring and data sharing.

Heretofore, the communications for this POWERLOGIC system were provided by an Ethernet gateway device, which was a stand-alone device capable of communicating through an RS485 daisy chain with one or more power monitoring and/or control devices. The Ethernet gateway device (EGW) did not include a Hyptertext transfer protocol server, and hence was unable to communicate with HTML pages of browsers or other servers. The EGW uses an MMS (Manufacturing Message Specification) protocol capable of 10 MBS communications on the Ethernet side. Essentially, the EGW provided a gateway device only. While the EGW has found widespread acceptance in the market, there is room for further improvement. The Ethernet communications device and system of the present invention presents such an improvement.

SUMMARY OF THE INVENTION

Briefly, in accordance with the foregoing, an Ethernet communications system for a power monitoring system comprises a processor capable of functioning as a master device, a communications interface capable of gathering, under control of said processor real-time information from one or more slave devices, said processor and said communications interface further being operative for presenting said real-time information in a format useable by Hypertext Markup Language (HTML) pages.

In another embodiment of the invention, an industrial power metering device comprises a power monitoring device, and an Ethernet communications device operatively coupled with said power monitoring device, said Ethernet communications device including a processor and a communications interface capable, under control of said processor, of gathering real-time information from said power monitoring device; and a web server capable of communicating through said communications interface for dynamically gathering, formatting and verifying real-time information from the power monitoring device.

In another embodiment of the invention, an Ethernet communications method for a power monitoring system comprises gathering real-time information from said power monitoring system and presenting said real-time information in a format useable by Hypertext Markup Language pages.

DETAILED DESCRIPTION OF THE ILLUSTRATED EMBODIMENT

Figure 1:
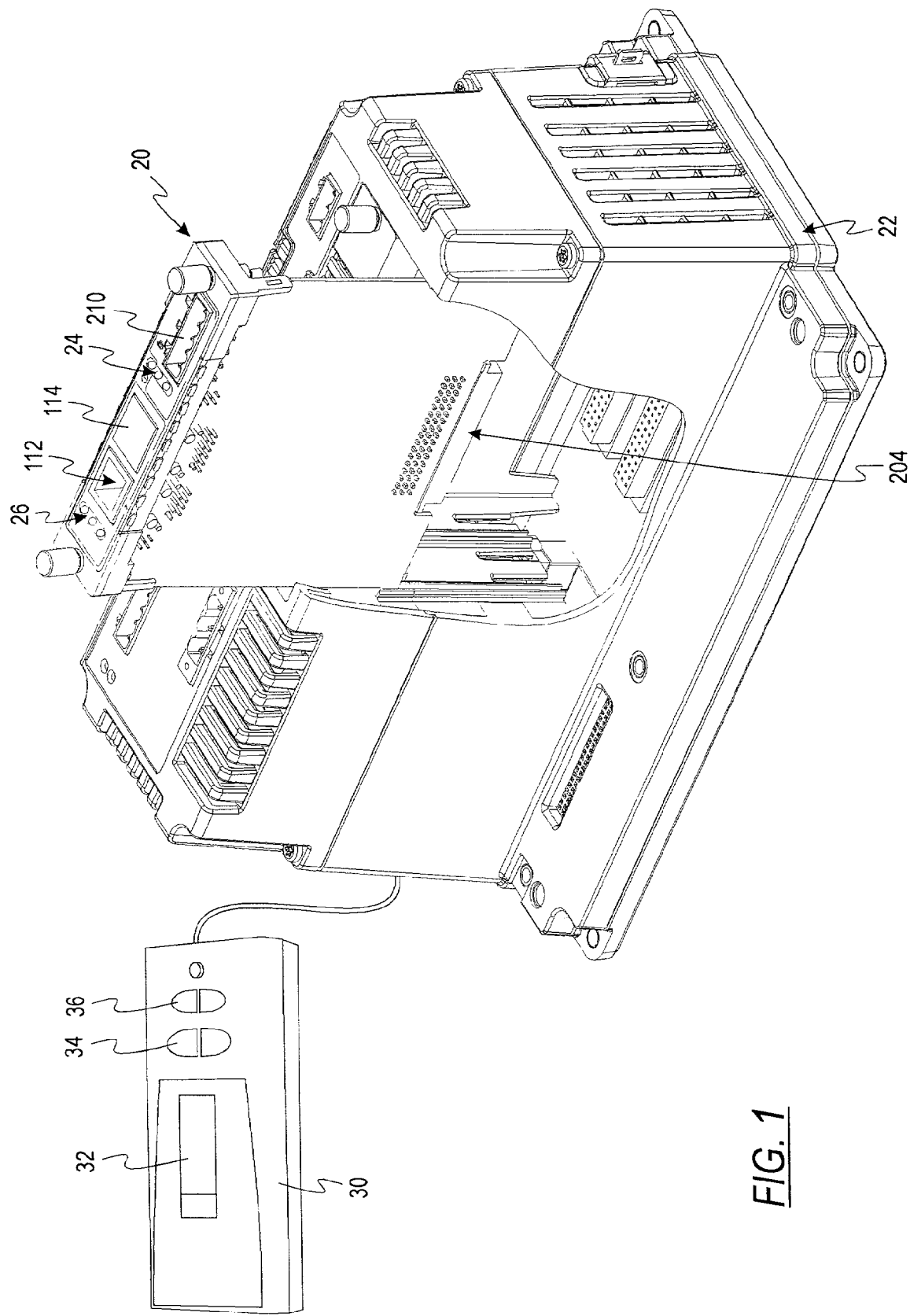
FIG. 1 is a perspective view showing a power monitoring device equipped with an Ethernet communications device in accordance with one embodiment of the invention.

Referring now to the drawings, and initially to FIG. 1, in accordance with one embodiment of the invention, an Ethernet communications device comprises a Circuit Monitor 3000/4000 series Ethernet Communications Card (ECC) 20 is an installable option card, which can be utilized by the Square D CM3000/4000 series of meters (CM) 22. This option card will allow the meters to be accessed over Ethernet media and provide a Gateway function by allowing Ethernet access to other Square D PowerLogic compatible Modbus, Jbus, and/or SyMax slave RS485 devices.

The ECC provides a fast, direct Ethernet communication connection for the Series 4000 Circuit Monitor and allow Ethernet gateway functionality to a wide variety of POWERLOGIC-compatible MODBUS, JBUS, and/or SY/MAX devices. A typical application example is shown in FIG. 3.

The ECC allows access to custom HTML pages (stored in the circuit monitor) via a standard web browser. The pages are best viewed using Internet Explorer version 5.0 or higher. These HTML pages may display information from the host circuit monitor and/or daisy-chained devices.

Figure 3:
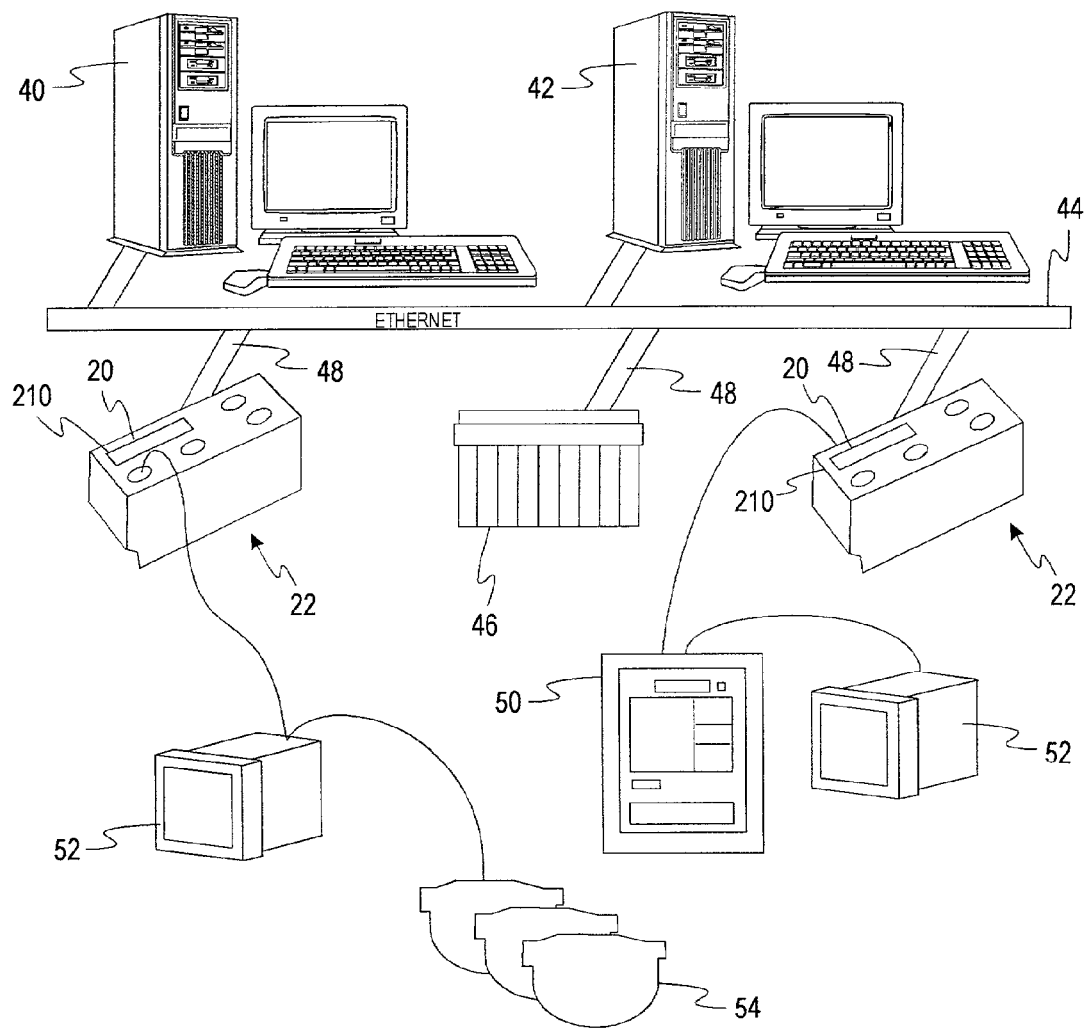
FIGS. 3, 4 and 5 show various embodiments of communications change which may be implemented using the communications device of the invention.

In FIG. 3, a POWERLOGIC System Manager 40 and a and a Standard Web Browser 42 are coupled to an Ethernet Network 44. One or more Series 4000 Circuit Monitor 22 with ECC 20 and NOE Ethernet Cards 46 may be coupled to the network 44 by means of a MODBUS® TCP/IP 48. The Series 4000 Circuit Monitors 22 may be daisy chained with the power monitoring devices, such as circuit monitors 50, power meters 52 and Enercept® meters 54 via the ECC's 20.

Figure 4:
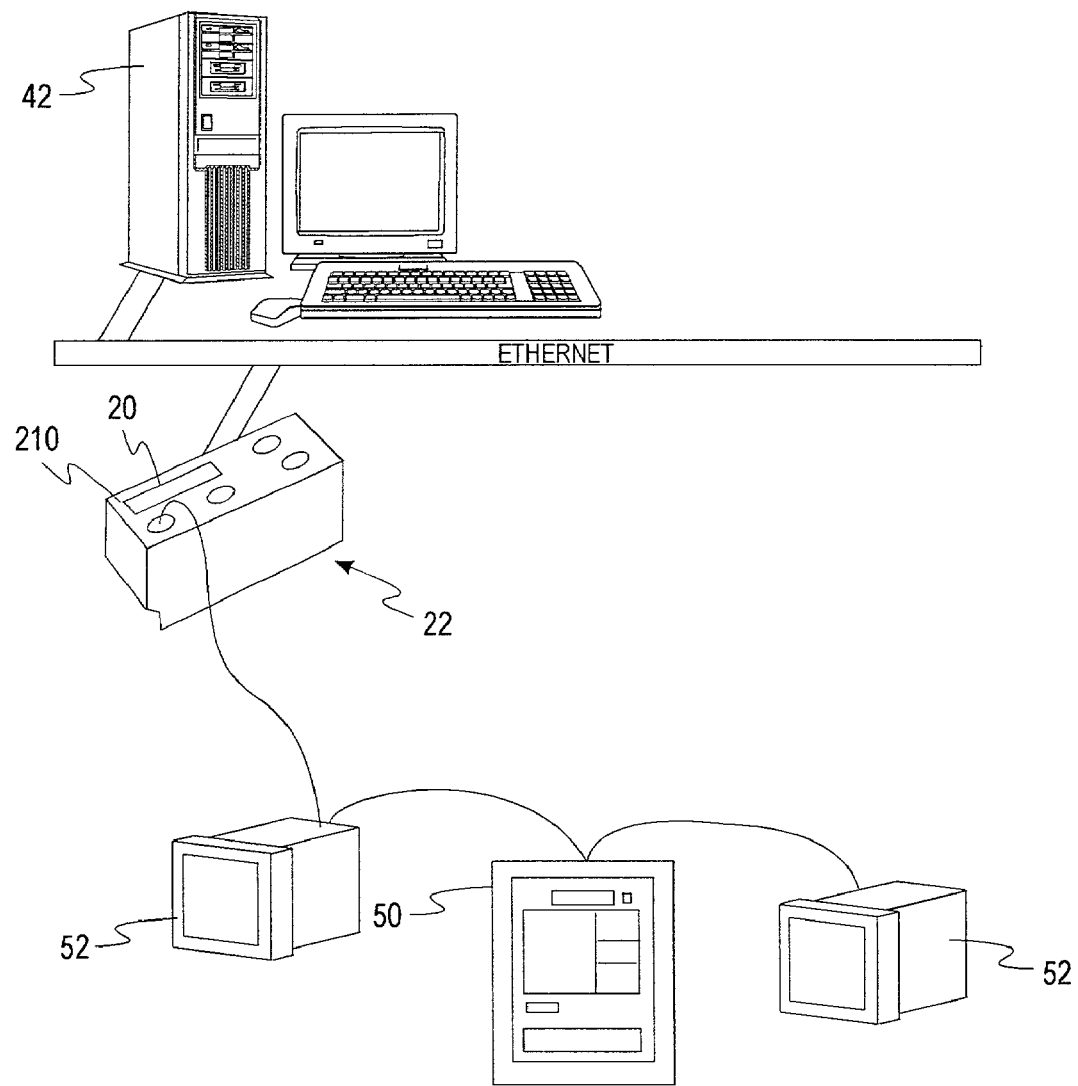

The RS-485 serial port 210 of the ECC 20 is used for communications with daisy-chained devices and is designed to support up to 31 defined devices without a repeater (FIG. 4), or up to 63 defined RS-485 devices with a repeater. The RS-485 enables communications via a 4-wire plus shield cable (Tx+, TX−, RX++, RX−, and Shld). It can also be configured for 2-wire plus shield.

For a 4-wire communication, Belden 8723 or 9842 cable or equivalent is recommended. For 2-wire communication, Belden 9841 or equivalent is recommended. If Enercept® meters are on the daisy chain, use Belden 1120A or equivalent.

Figure 5:
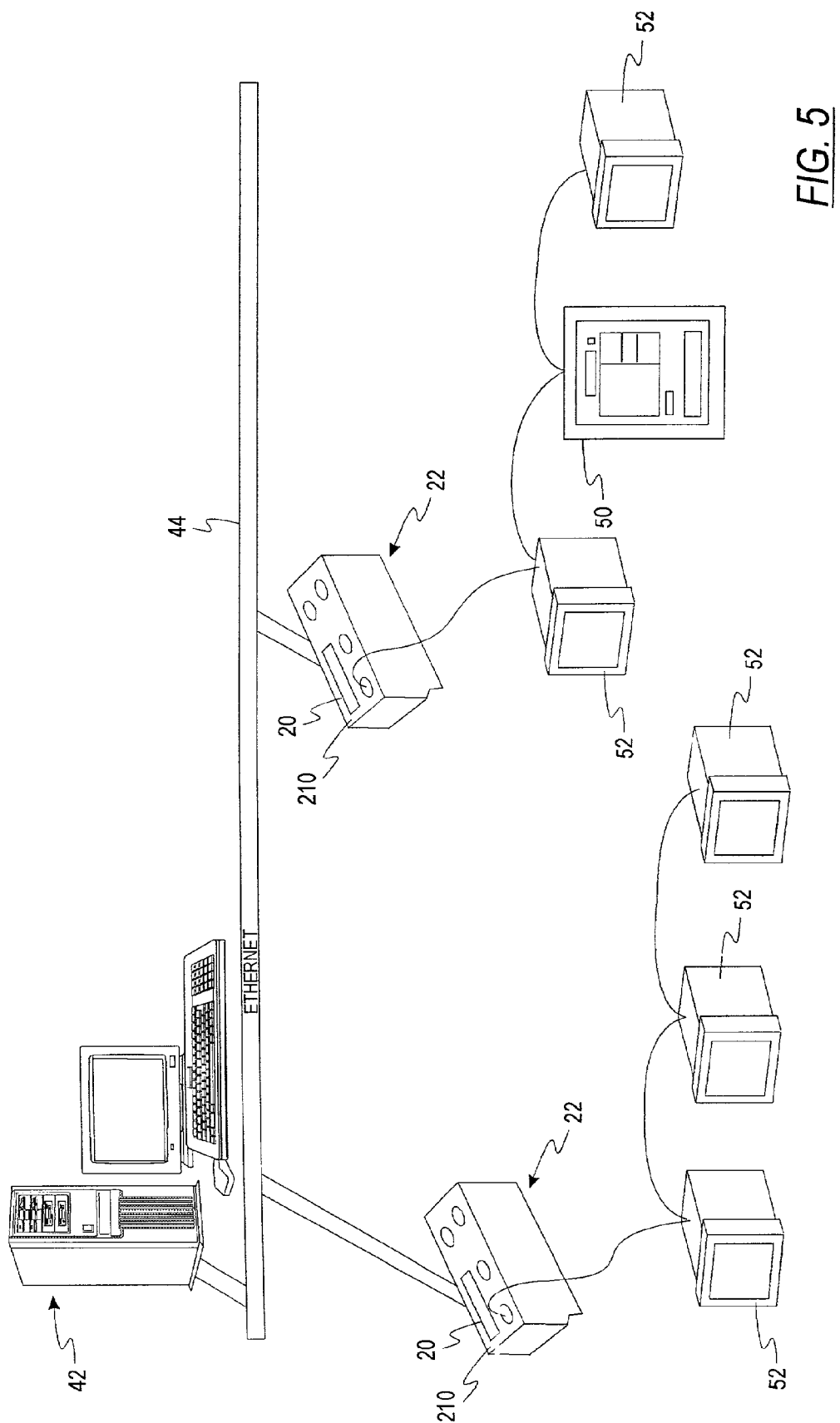

The ECC 22 has two on-board Ethernet ports (see FIG. 1) 10/100Base TX Twisted Pair 112 and 100Base Fx 114. FIG. 5 shows a typical network application.

Table 1 below illustrates a number of functions of the ECC.

TABLE 1

| ECC General Functionality |
|---|
| High-speed, direct Ethernet communications to the CM the ECC is inserted into |
| RS485 support for up to 31 PowerLogic compatible, |

TABLE 1-continued

ECC General Functionality

Figure 2:
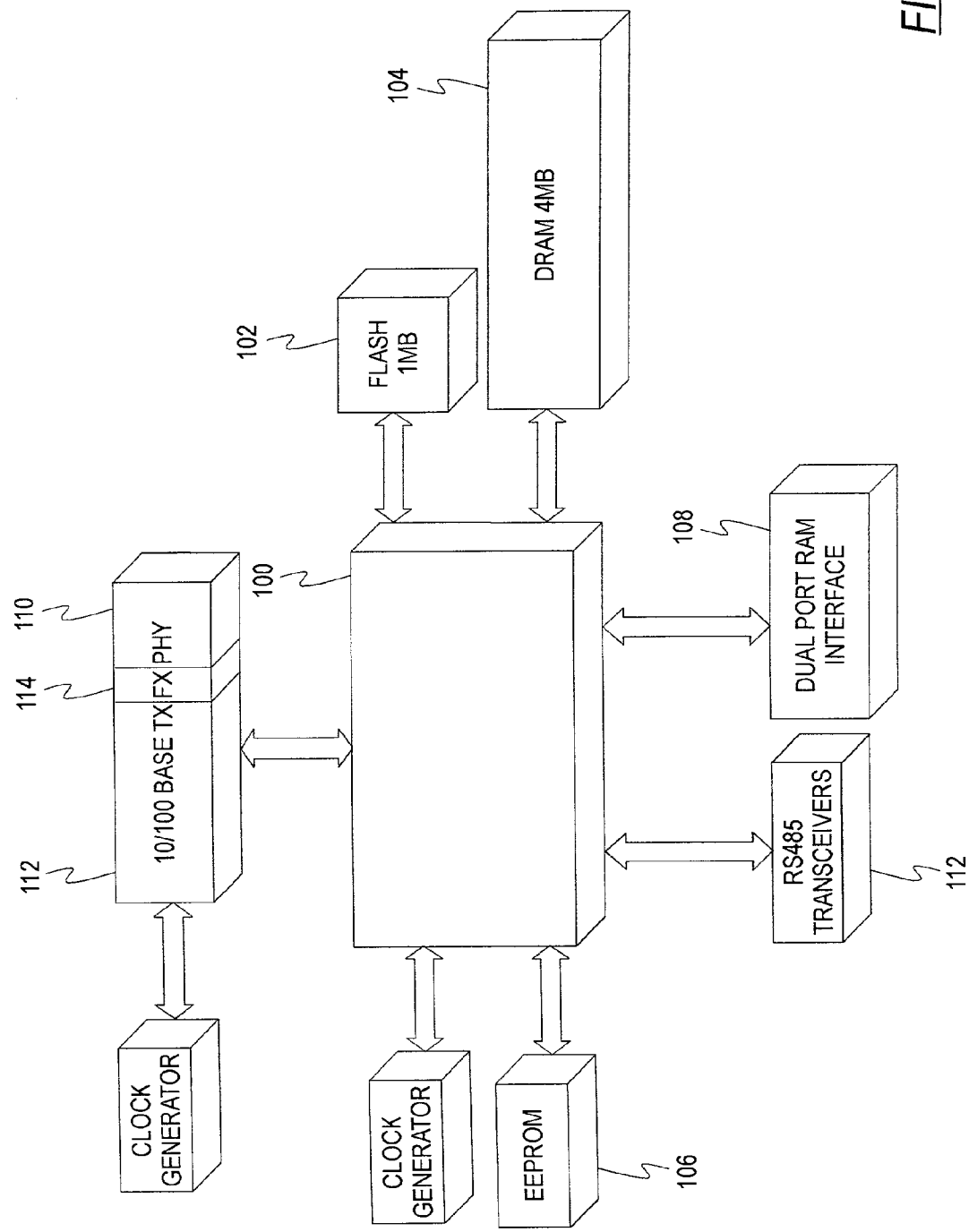
FIG. 2 is a functional block diagram illustrating an Ethernet communications device in accordance with one embodiment of the invention.

Modbus, Jbus, and/or SyMax slave devices
    RS485 2 and 4-wire communications with parity as even
or none up to 38.4K baud
        10/100baseT Ethernet twisted pair (TP) communications support
        100baseFx Ethernet (Fiber) communications
        Access to attached slave devices from client Modbus/TCP Ethernet
communications
        ECC setup/configuration/diagnostics by password protected HTML
Ethernet communications
        ECC firmware download by password protected FPT Ethernet
communications
        HTML custom device table download by password protected FTP
Ethernet communications
        Multi-lingual HTML support
        ECC setup/configuration download by password protected FTP
Ethernet communications
        Access to attached devices from client MMS/TCP Etherenet
communications
        Time synchronization to attached slave devices by SNTP Ethernet
communications
        Ability for CM/Sub-net master initiated communications Microprocessor The microprocessor or CPU 100 in the illustrated embodiment (see FIG. 2) is the NET silicon NET+ARM–40. This hardware architecture was developed by NET silicon to optimize network performance. The microprocessor 100 can run at 15 MIPS (million Instructions Per Second) but can actually reach 30 MIPS peak performance with the correct peripherals and configuration of the onboard 4K cache. The internal frequency is 33 MHz driven by the external clock generator at 18.432 MHz. The external bus speed is 33 MHz. The following is a list of the main components contained in the NET+ARM chip that is utilized in the design.

32 bit 3.3V ARM7TDMI RISC Processor (not 5V tolerant)
    10/100 Ethernet MAC
    Glueless interface to 8, 16, and 32 bit peripherals
    10 Channel DMA Controller
    1 of 2 Asynchronous Serial Ports with FIFO
    5 programmable chip selects
    Programmable wait states
    DRAM refresh controller
    2 programmable timers
    Programmable watchdog timer
    Programmable Phase Lock Loop (PLL)
    ARM embedded MULTI-ICE JTAG (not to be confused with 1149.1 JTAG Testing)

Chip Selects

Various peripheral devices are connected to one of five programmable chip selects. These chip selects can be configured for 8, 16, or 32 bit peripherals. The following is a table of how the chip selects are configured for use

TABLE 2

Chip Selects

| Chip Select | Peripheral | Wait States | Start Address | Size | Width |
|---|---|---|---|---|---|
| CS0 | Flash (102) | 1 | 0x0000000 | 1 Mbyte | 16 |
| CS1 | DRAM RAS 1 (104) | 0 | 0x1000000 | 4 Mbytes | 32 |
| CS2 | — | — | — | — | — |
| CS3 | EEPROM (106) | 4 | 0x2000000 | 8 Kbytes | 8 |
| CS4 | Dual Port RAM (108) | 0 | 0x3000000 | 2 Kbyte | 8 |

Input/Output Pins

There are three ports of eight signals that can be configured to be used for either general purpose I/O bits, asynchronous serial channel signals, or interrupt inputs. Each port's signals can be configured independently. The following is a table of how the ports' signals are used.

TABLE 3

Input/Output Pins

| Signal | Type | Description |
|---|---|---|
| PortA0 | — | Not used |
| PortA1 | — | Not used |
| PortA2 | — | Not used |
| PortA3 | RXDA | Receive data serial channel A signal |
| PortA4 | — | Not used |
| PortA5 | RTSA | Request to send serial channel A signal |
| PortA6 | — | Not used |
| PortA7 | TXDA | Transmit data serial channel A signal |
| PortB0 | — | Not used |
| PortB1 | — | Not used |
| PortB2 | — | Not used |
| PortB3 | — | Not used |
| PortB4 | — | Not used |
| PortB5 | — | Not used |
| PortB6 | — | Not used |
| PortB7 | — | Not used |
| PortC0 | Interrupt Input | External interrupt input signal for the Ethernet PHY |
| PortC1 | Output | Output signal for serial channel A transmit LED |
| PortC2 | Output | Output signal for serial channel A receive LED |
| PortC3 | Interrupt Input | External interrupt input signal for the dual port RAM |
| PortC4 | HDRS | Hardware reset output signal for soft resets |
| PortC5 | Input | Optional Ethernet fiber transceiver detection input signal |
| PortC6 | Input | Ethernet link input status signal |
| PortC7 | — | Not used |

Fast Media Access Controller (MAC)

The NET+ARM has an integrated 10/100 Mbit Media Access Controller (MAC) for Media Independent Interfaces (MII). This interface is utilized in conjunction with an external Fast Ethernet PHY (Physical Interface) 110 to allow for 10/100 Mbit TP and 100 Mbit Fiber communications.

Memory

Memory is commonly referred to as volatile and non-volatile types. The ECC is designed using memory peripherals of both types. It has 4 Mbytes of DRAM 104 and 2 Kbytes of Dual Port RAM 108. Both of these peripherals are of the volatile memory type. It has 1 Mbytes of Flash 102 and 8 Kbytes of EEPROM 106. Both of these peripherals are of the non-volatile memory type. The following table shows the memory ranges for the peripherals used in the design of the ECC.

TABLE 4

Memory Map

| Peripheral | Type | Size | Memory Range |
|---|---|---|---|
| Program Storage Flash (102) | Non-Volatile | 1 Mbytes | 0x0000000-0x00F9FFF |
| Program Execution/Stack DRAM (104) | Volatile | 4 Mbytes | 0x1000000-0x13E7FFF |
| Configuration storage EEPROM (106) | Non-Volatile | 8 Kbytes | 0x2000000-0x2001FFF |
| Inter-processor Communications DPRAM (108) | Volatile | 2 Kbytes | 0x3000000-0x30007FF |

Flash

The Flash peripheral 102 is used for program (firmware) storage. At boot-up, the program code will be copied into DRAM for fast execution. The Flash is an 8 Mbit (512K×16) part with an access time of 90 ns.

Dram

The DRAM peripherals (104) are used for program execution, stack space, and firmware downloads. There are two 16 Mbit (1M×16) DRAM peripherals with access times of 50 ns. These two peripherals are used together to allow for 32 bit wide data bus accesses by the processor. This combination of bus size and fast access speeds will allow for maximum execution of the processor with zero wait states.

EEPROM

The EEPROM peripheral 106 is used for limited configuration storage relevant to each particular ECC. Probably, the most important information is the Ethernet Media Access Controller (MAC) address. The EEPROM 106 is a 64 Kbit (8K×8) part with an access time of 200 ns.

Dual Port RAM

The dual port RAM peripheral 108 is used for the high-speed inter-processor communications between the ECC and the CM3000/4000 series devices. The dual port RAM is a 16 Kbit (2K×8) part with an access time of 55 ns. This speed will allow access to this peripheral with no wait states at the full speed of the processor.

Other Peripherals and Components

There are a few other peripherals and components that are used to complete the ECC. These peripherals complement the processor and memory to allow for the fulfillment of all the functional requirements implemented.

RS485 Interface

The RS485 communications interface 112 is a 4-wire plus shield interface (Tx+, Tx−, Rx+, Rx−, and Shld). This interface has electrical isolation to internal circuitry up to 7500 Vac(pk) for duration of one second or less by means of optical isolation and DC-to-DC converter. The transceiver used is protected against 15 kV electrostatic discharge (ESD) shocks using the Human Body Model. Also, the transceiver features reduced slew-rate drivers that minimize Electromagnetic Interference (EMI) and reduce reflections caused by improperly terminated cables.

The connector used to wire into this interface is a 5-point screw type commonly known as a "Phoenix" or "Terminal Block" connector.

Like all RS485 daisy chains (see FIG. 3), correct biasing is required to ensure reliable communications. Traditionally, a Multipoint Communications Adapter (MCA) is used at the beginning/master of the daisy chain. This adapter circuitry is built into the ECC so no adapter will be needed externally. This internal biasing is calculated based on the daisy chain always being terminated and on using cabling with a 120 ohm impedance characteristic (Belden cable 9842). Also, RS485 daisy chain termination is required to ensure reliable communications. The last device on the daisy chain usually needs to have a Multipoint Communications Terminator (MCT). Ideally, the last device on the daisy chain should have a termination resistor of 120 ohms across its receive plus and minus pair only.

The RS485 interface is designed to support up to 31 slave RS485 4-wire devices. The "guaranteed" maximum number of devices capable of being supported on a single daisy chain is determined based on the relation of baud rate, the length of the daisy chain, and the types of slave RS485 devices (2-wire/4-wire). The RS485 interface will support daisy chains that fall within the following specifications.

TABLE 5

4-wire RS485 Distances

| Baud Rate | Max distance for 1-16 devices | Max distance for 17-32 devices |
|---|---|---|
| 1200 | 10,000 ft (3,048 m) | 10,000 ft (3,048 m) |
| 2400 | 10,000 ft (3,048 m) | 5,000 ft (1,524 m) |
| 4800 | 10,000 ft (3,048 m) | 5,000 ft (1,524 m) |
| 9600 | 10,000 ft (3,048 m) | 4,000 ft (1,219 m) |
| 19200 | 5,000 ft (1,524 m) | 2,500 ft (762 m) |
| 38400 | 5,000 ft (1,524 m) | 1,500 ft (457 m) |

TABLE 6

2-wire RS485 Distances

| Baud Rate | Max distance for 1-8 devices | Max distance for 9-16 devices |
|---|---|---|
| 1200 | 10,000 ft (3,048 m) | 10,000 ft (3,048 m) |
| 2400 | 10,000 ft (3,048 m) | 5,000 ft (1,524 m) |
| 4800 | 10,000 ft (3,048 m) | 5,000 ft (1,524 m) |
| 9600 | 10,000 ft (3,048 m) | 4,000 ft (1,219 m) |
| 19200 | 5,000 ft (1,524 m) | 2,500 ft (762 m) |
| 38400 | 2,500 ft (1,524 m) | 1,500 ft (457 m) |

Fast Ethernet Physical (PHY) Transceiver Interface

The Fast Ethernet Transceiver (PHY) 110 provides a Media Independent Interface (MII) for easy attachment to the 10/100 Media Access Controller (MAC) which is integrated into the NET+ARM processor. The PHY is capable of directly driving an RJ45 interface through magnetics and termination resistors. The PHY also provides a pseudo-ECL interface for use with 100BaseFX fast fiber transceivers.

10/100BaseTX Interface (RJ45)

The RJ45 112 interface uses two signal pairs (one for transmit and one for receive) and a center tap for the transmit transformer. These same signal pairs, magnetics, and termination resistors are used for both 10 Mbit and 100 Mbit operation. This interface can drive a twisted pair cable up to 100 m (328 ft) in length when using data grade twisted-pair wire that has a characteristic impedance of 100 ohms and meets the EIA/TIA Category Five standard wire specifications.

The cable used can be either shielded twisted pair (STP) or unshielded twisted pair (UTP). Great care should be taken here to not use IBM type 1 cabling, which is STP at 150 ohm. In the past, STP meant IBM 150 ohm cabling. Today, there is Cat 5 shielded cabling which is 100 ohm. In the USA, the cable type used is usually unshielded, in Europe it is often shielded. Most shielded 4 pair cables used today are 100 ohm, either with overall foil shield (FTP) or individually shielded pairs within a braided sheath (ScTP) Most of the industry appears to be going to ScTP.

The RJ45 interface is capable of auto negotiation for speed and duplex mode. If the link partner is also capable of auto negotiation, the two devices will exchange Fast Link Pulse (FLP) bursts to communicate their capabilities to each other. The highest common capabilities of the two will then be agreed upon. If the link partner is not capable of auto negotiation, the partner will be transmitting either 10 Mbits Normal Link Pulses (NLP) or 100 Mbit idle symbols. The RJ45 interface will detect either NLPs or Idle symbols and will automatically configure itself to match the speed but only in half-duplex mode.

The magnetics used here are determined by the requirements of the Fast Ethernet Physical (PHY) transceiver, for example, a transformer module with a "transmit turns ratio" of 1:1.

Fast Fiber Transceiver

The Fast Fiber Transceiver 114 is compliant with the optical performance requirements of the physical layer of the 100BaseFX version of the IEEE 802.3u specifications. This specification is defined as the FDDI PMD Standard ISO/IEC 9314-3:1990 and ANSI X3.166-1990.

The transceiver has a duplex LC connector receptacle and is compatible with 1300 nm wavelength multimode fiber connections. It is optimized for 62.5 or 50/125 micron multimode graded index glass optical fiber per TIA-568A and ISO 11801. Also, the transceiver is capable of signal integrity up to 2000 m in length of multimode full duplex fiber.

A few things to note, there is no industry standard for auto-negotiation on 100BaseFX. To use this interface, the user will have to force this mode by means of the setup interface. It may be possible to auto-negotiate to 100BaseFX with logic in the Firmware. Also, this interface does not support 10FL (10 Mbits fiber) applications.

This component is presently the most expensive one in the design. The board will be designed to have the ability to detect if this component is present or not. This will allow for the manufacture of two types of boards if needed. The primary board will have the fast fiber transceiver populated and will allow for the use of the twisted pair or the fiber interface. The secondary board will not have the fast fiber transceiver populated and will allow for the use of only the twisted pair interface.

Light Emitting Diodes (LEDs)

There are two tri-level LED indicators 24, 26 (see FIG. 1). The first one 24 will be of color green/green/yellow (Tri-level 1), and the other one 26 will be of color yellow/green/yellow (Tri-level 2). The following table shows what each individual LED represents.

TABLE 7

LED Descriptions

| Unit and Color | Description |
| --- | --- |
| Tri-level 1 green | Power is being received from the source (CM) |
| Tri-level 1 green | RS485 Transmit in progress |
| Tri-level 1 yellow | RS485 Receive in progress |
| Tri-level 2 yellow | Ethernet link good |
| Tri-level 2 green | Ethernet Transmit in progress |
| Tri-level 2 yellow | Ethernet Receive in progress |

Circuit/Processor Reset

Figure 6:
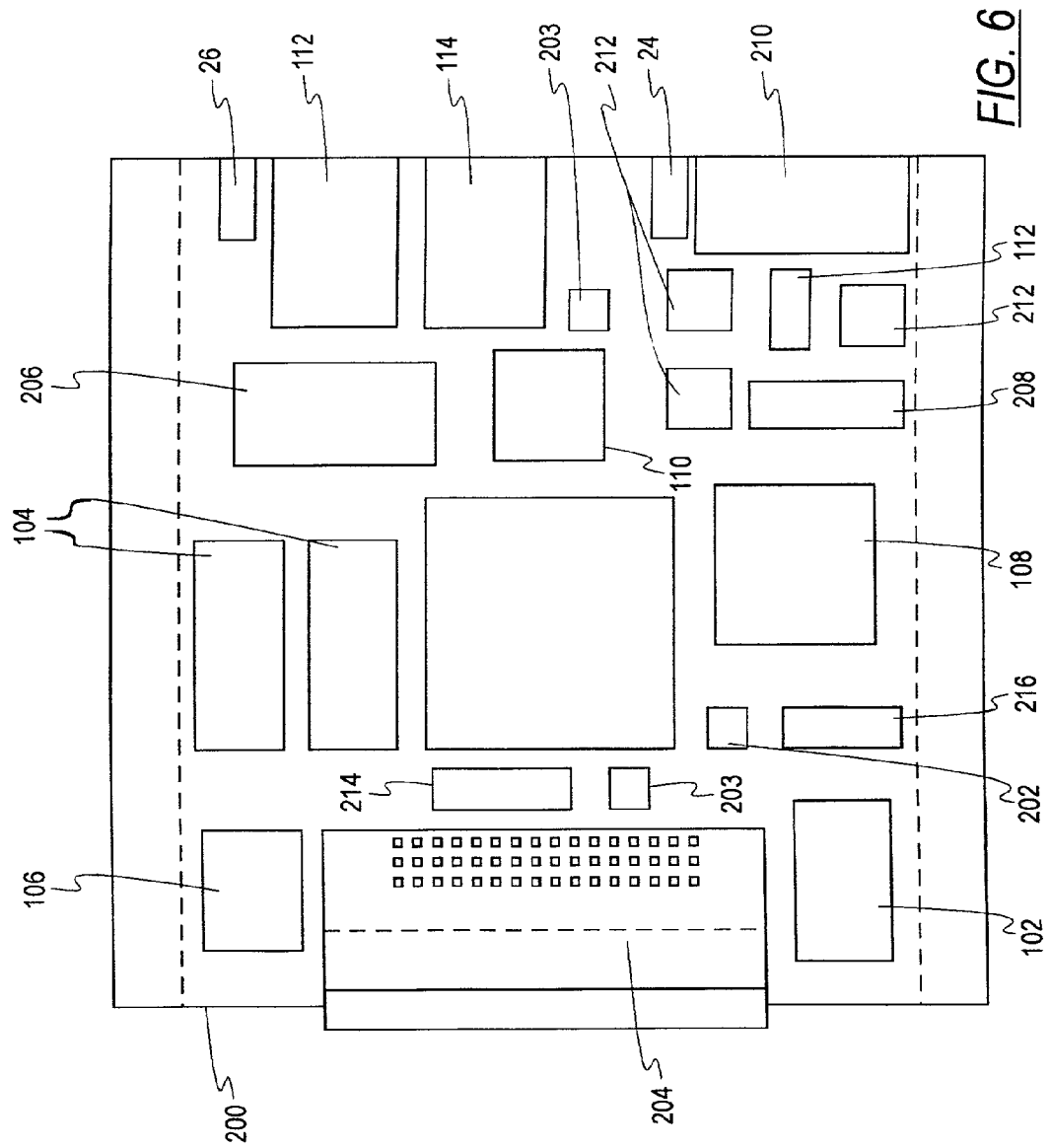

The overall circuit board power is kept in check by a voltage monitor 202 (see FIG. 6). This device monitors three vital system conditions. It monitors the 5-volt supply from the CM 22, the 3.3-volt supply from the CM, and the external override/reset controlled by the CM.

When an out-of-tolerance condition is detected on either of the voltages, this device will reset the board 200. This capability helps ensure against firmware corruption and other "flaky" operations that occur due to out-of-tolerance power events.

Also, this device will allow an easy way for the CM to be able to control the board in the need of a reset.

Power Supply

The ECC does not have its own power supply. The ECC will receive its power requirements from the CM it is inserted into. The CM will need to supply +5 Vdc and +3.3 Vdc to the ECC through the Option slot connectors 204. The amount of the supply is based on the following feasibility study.

TABLE 8

ECC Estimated Power Consumption

| Quantity | Description | Typical Power (mW) | Maximum Power (mW) |
| --- | --- | --- | --- |
| 1 | Fast Fiber LC Connector | 165 | 165 |
| 1 | IC, NETA 40-3 | 330 | 495 |
| 1 | IC, Altima PHY | 280.5 | 330 |
| 1 | IC, 8 Mbit Flash Memory | 49.5 | 99 |
| 2 | IC, 1M × 16 (16-MBIT) DRAM | 957 | 1056 |
| 1 | IC, 8K × 8 EEPROM | 0.165 | 26.4 |
| 1 | IC, 1K × 8 Dual-Port RAM | 247.5 | 297 |
| 1 | Crystal, 18.432 MHZ SMT | | |
| 1 | Crystal, 25 MHZ SMT | | |
| 1 | Microprocessor Reset | 0.25 | 0.25 |
| 3 | Opto Isolator | 375 | 600 |
| 1 | DC/DC Converter | 400 | 625 |
| 1 | RS485 Dual Driver/Receiver | 0.6 | 5 |
| 1 | Single Port Xformer | | |
| 1 | PCB RJ-45 Shielded Jack | | |
| 1 | Tri-Level LED | | |
| 1 | Tri-Level LED | | |
| 1 | 5 Position Terminal Plug | | |
| 1 | 5 Position Terminal Plug | | |
| 1 | Connector 48Pin Eurocard | | |
| 1 | Misc Passive/PCB | 49.5 | 108.9 |
| | Twisted Pair Only Total > | 2690.015 | 3642.55 |
| | Total > | 2855.015 | 3807.55 |
| | 3.3V Burden Total > | 2079.165 | 2577.3 |
| | 5V Burden Total > | 775.85 | 1230.25 |

Mechanical

Figure 7:
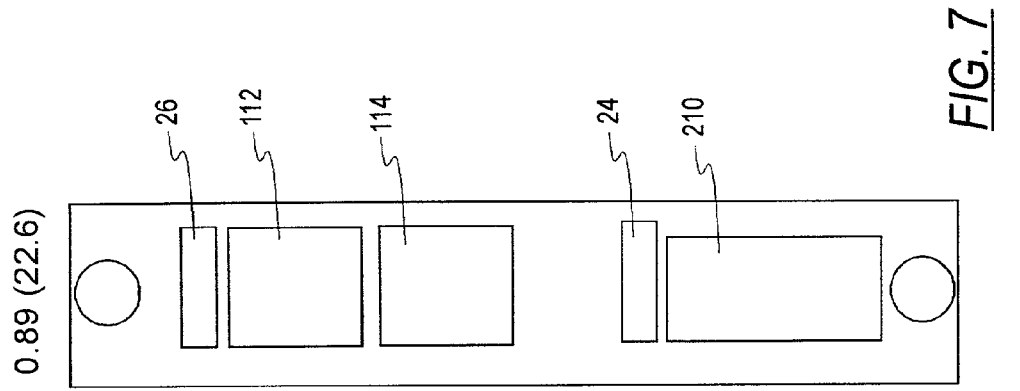
FIGS. 6 and 7 show a simplified plan view and simplified top view of an Ethernet communications card in accordance with one embodiment of the invention.

The size and dimensions of the ECC has already been pre-determined by the specifications of the option slots in the CM. The FIGS. 6 and 7 and Table 9 show the board layout.

TABLE 9

Component Key for Mechanical Feasibility Drawing

| Key # | Quantity | Component | Key # | Quantity | Component |
| --- | --- | --- | --- | --- | --- |
| 102 | 1 | Flash | 208 | 1 | DC to DC |
| 202 | 1 | Reset | 104 | 2 | Dram |
| 203 | 2 | Crystal | 210 | 1 | Terminal Block |
| 110 | 1 | PHY | 106 | 1 | EEProm |
| 112 | 1 | RS485 | 108 | 1 | Dual Port Ram |
| 114 | 1 | Fiber | 212 | 3 | Optocouplers |
| 206 | 1 | Transformer | 204 | 1 | Eurocard Connector |
| 112 | 1 | RJ45 | 214 | 1 | Jtag Connector |
| 24, 26 | 2 | LEDs | 216 | 1 | Bus Switch |
| 100 | 1 | CPU | | | |

Ethernet Communications

Ethernet communications will be utilized, wherever possible and feasible to do so, to allow for the "remote" control/maintenance of the ECC. The goal of this design is to make the ECC a passive/reactive device requiring minimal setup. The ECC will basically react to the "outside" world and do what it "thinks" is the best thing to do unless configured to do something different via setup. The Ethernet capabilities will be primarily used for ECC setup, diagnostics, firmware update, and access to attached slave devices by means of Hypertext Markup Language (HTML) and Hypertext Transfer Protocol (HTTP), File Transfer Protocol (FTP), Modbus over TCP/IP (ModbusTCP), and future plans for Manufacturing Message Specification over TCP/IP (MMSTCP).

HTTP Server and HTML Pages

A small subset of HTML v1.0 will be used with the HTTP server in the ECC primarily for ECC setup and diagnostics. With the onset and popularity of the World Wide Web and the Internet, the use of a browser is practically commonplace. This capability of the ECC allows for almost any user of an Internet browser to easily access and configure the ECC device. The recommended browser of choice should be Internet Explorer v5.0 or greater.

Figure 8:
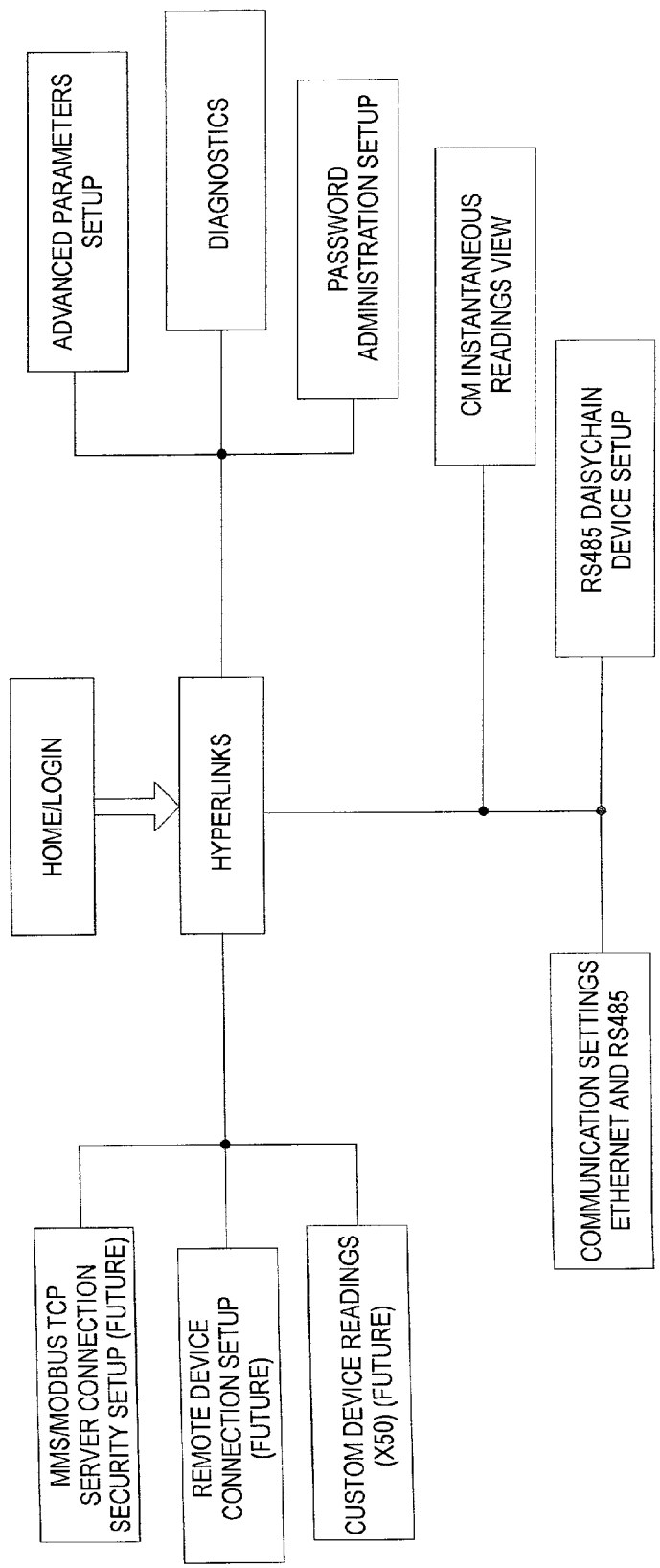
FIG. 8 shows an HTML page flow diagram for an Ethernet communications device in accordance with one embodiment of the invention.

FIG. 8 shows one embodiment of the ECC's HTML flow page.

HTML Security

The ECC's HTML security allows for four configurable account password access levels. These password access levels will be divided into three Password Accounts and one Administrator Account.

HTML Security Theory of Operation

When a user attempts to access the ECC for the first time during a web browser session, the ECC will force that user into the password logon page. Once there, the users will login to the ECC using one of the four defined passwords. During this login, the ECC will generate a random number and associate that password access level with it. The random number will then be the users "access token" and will automatically be appended to all the HTML page transactions during that session. This token will stay "alive" as long as the user keeps the session active by making requests to the ECC. Once this token is inactive for more than the default of ten minutes, the ECC will "expire" the token. The ECC will allow any combination, including redundant use, of all the passwords to allow up to ten access tokens to be active at any given time. This limits the number of active users viewing HTML pages to ten. The amount of time the ECC will wait during the inactivity period before "expiring" an access token will be configurable. For normal operations, it is recommended that the user return to the main links page and select to "log out" when fished interfacing with the ECC to immediately release that token slot for another user.

HTML Administrator Account

One of the four password accounts in the ECC will always be the Administrator password. This password account will always be granted full access to every HTML page available in the ECC and will also overlap to be the only password used for FTP operations. The only part of this account that is configurable is the password itself. The Administrator password will default to "admin". The Administrator password will be from one to eight characters and stored in four registers like the following table.

TABLE 10

Administrator Password Setup Parameters

| Register* | HiByte | LoByte |
|---|---|---|
| 514 | Admin password ASCII character 1 | Admin password ASCII character 2 |
| 515 | Admin password ASCII character 3 | Admin password ASCII character 4 |
| 516 | Admin password ASCII character 5 | Admin password ASCII character 6 |
| 517 | Admin password ASCII character 7 | Admin password ASCII character 8 |

*Register numbers used in the tables throughout this document are CM registers.

HTML User Password Accounts

Three of the four password accounts in the ECC will be left to be used only for HTML access and will be called the User Password Accounts. Only the Administrator Account sets up these passwords. The parts of these accounts that are configurable are the passwords themselves and the level of access each password will allow to each HTML page in the ECC. These passwords will be configurable to allow no access, view-only access, or full access to each individual HTML page in the ECC. These four passwords can be selectively given to and used by multiple users. The user passwords will default to "master", "engineer", and "operator". The passwords will be from one to eight characters and stored in four registers each like the following tables

TABLE 11

Pass1 Password Setup Parameters

| Register | HiByte | LoByte |
|---|---|---|
| 518 | Pass1 password ASCII character 1 | Pass1 password ASCII character 2 |
| 519 | Pass1 password ASCII character 3 | Pass1 password ASCII character 4 |
| 520 | Pass1 password ASCII character 5 | Pass1 password ASCII character 6 |
| 521 | Pass1 password ASCII character 7 | Pass1 password ASCII character 8 |

TABLE 12

Pass2 Password Setup Parameters

| Register | HiByte | LoByte |
|---|---|---|
| 526 | Pass2 password ASCII character 1 | Pass2 password ASCII character 2 |
| 527 | Pass2 password ASCII character 3 | Pass2 password ASCII character 4 |
| 528 | Pass2 password ASCII character 5 | Pass2 password ASCII character 6 |
| 529 | Pass2 password ASCII character 7 | Pass2 password ASCII character 8 |

TABLE 13

Pass3 Password Setup Parameters

| Register | HiByte | LoByte |
|---|---|---|
| 534 | Pass3 password ASCII character 1 | Pass3 password ASCII character 2 |
| 535 | Pass3 password ASCII character 3 | Pass3 password ASCII character 4 |
| 536 | Pass3 password ASCII character 5 | Pass3 password ASCII character 6 |
| 537 | Pass3 password ASCII character 7 | Pass3 password ASCII character 8 |

The access level each password will have to each HTML page will be held in four registers, totaling twelve. This means that each password will have four registers associated with it according to the following table.

TABLE 14

Passwords Access Setup Parameters

| Register | HiByte | LoByte |
|---|---|---|
| 522 | Pass1 Password HTML Page Access Bitmap (Most Significant Word) | |
| 523 | Pass1 Password HTML Page Access Bitmap (2$^{nd}$ Most Significant Word) | |
| 524 | Pass1 Password HTML Page Access Bitmap (2$^{nd}$ Least Significant Word) | |
| 525 | Pass1 Password HTML Page Access Bitmap (Least Significant Word) | |
| 530 | Pass2 Password HTML Page Access Bitmap (Most Significant Word) | |
| 531 | Pass2 Password HTML Page Access Bitmap (2$^{nd}$ Most Significant Word) | |
| 532 | Pass2 Password HTML Page Access Bitmap (2$^{nd}$ Least Significant Word) | |
| 533 | Pass2 Password HTML Page Access Bitmap (Least Significant Word) | |
| 538 | Pass3 Password HTML Page Access Bitmap (Most Significant Word) | |
| 539 | Pass3 Password HTML Page Access Bitmap (2$^{nd}$ Most Significant Word) | |
| 540 | Pass3 Password HTML Page Access Bitmap (2$^{nd}$ Least Significant Word) | |
| 541 | Pass3 Password HTML Page Access Bitmap (Least Significant Word) | |

Within these registers, the bits are utilized to represent the access ability of each password to each HTML page. Each HTML page will be represented by two bits. This means that there can be up to thirty-two pages secured by one of four access levels. The following table shows the value representation of the access levels.

TABLE 15

Password Access Values

| Bit Values | Access Level |
|---|---|
| 0x00 | No access |
| 0x01 | Reserved |
| 0x02 | View only access |
| 0x03 | Full access |

The following table shows the representation of the access levels that the passwords have to each HTML page

TABLE 16

Password HTML Access Bitmaps

| Register | Bits | HTML page |
|---|---|---|
| 522 | 15 and 14 | Pass1 access to Home Page |
| 522 | 13 and 12 | Pass1 access to CM Instantaneous Readings View |
| 522 | 11 and 10 | Pass1 access to Custom Device Page 1 View (Future) |
| 522 | 9 and 8 | Pass1 access to Custom Device Page 2 View (Future) |
| 522 | 7 and 6 | Pass1 access to Custom Device Page 3 View (Future) |
| 522 | 5 and 4 | Pass1 access to Custom Device Page 4 View (Future) |
| 522 | 3 and 2 | Pass1 access to Custom Device Page 5 View (Future) |
| 522 | 1 and 0 | Pass1 access to Communication Settings Setup |

TABLE 16-continued

Password HTML Access Bitmaps

| Register | Bits | HTML page |
|---|---|---|
| 523 | 15 and 14 | Pass1 access to RS485 Daisy chain Device Setup |
| 523 | 13 and 12 | Pass1 access to Diagnostics |
| 523 | 11 and 10 | Pass1 access to MMS/ModbusTCP Server Security Setup (Future) |
| 523 | 9 and 8 | Pass1 access to Remote Device Connection Setup (Future) |
| 523 | 7 and 6 | Reserved |
| 523 | 5 and 4 | Reserved |
| 523 | 3 and 2 | Reserved |
| 523 | 1 and 0 | Reserved |
| 524 | 15 and 14 | Reserved |
| 524 | 13 and 12 | Reserved |
| 524 | 11 and 10 | Reserved |
| 524 | 9 and 8 | Reserved |
| 524 | 7 and 6 | Reserved |

TABLE 16-continued

Password HTML Access Bitmaps

| Register | Bits | HTML page |
|---|---|---|
| 524 | 5 and 4 | Reserved |
| 524 | 3 and 2 | Reserved |
| 524 | 1 and 0 | Reserved |
| 525 | 15 and 14 | Reserved |
| 525 | 13 and 12 | Reserved |
| 525 | 11 and 10 | Reserved |
| 525 | 9 and 8 | Reserved |
| 525 | 7 and 6 | Reserved |
| 525 | 5 and 4 | Reserved |
| 525 | 3 and 2 | Reserved |
| 525 | 1 and 0 | Reserved |
| 530, 531, 532, 533, 538, 539, 540, 541 | | This format is duplicated for registers 530, 531, 532, 533 (Pass2 access) and 538, 539, 540, 541 (Pass3 access) |

A Password Administration Setup HTML page will be provided. This page will be accessible by the administrator password only.

ECC Setup via HTML

All the setup information will be stored in the CM that the ECC is inserted into. This will allow for the ECCs to be "swappable". The ECC setup will primarily be done with HTML pages, but the CM display will have to be used during the initial steps.

Initial Setup

After the physical installation, the first step to completing the ECC setup will be via the CM display. The CM display will be used to setup the initial TCP/IP address, TCP/IP subnet mask, the TCP/IP router, and the Ethernet physical connection to use (fiber or twisted pair). With these parameters in place, the ECC will be accessible via the Ethernet, and the rest of the ECC setup can be done via HTML and a standard web browser by FTP.

HTML Ethernet—TCP/IP Setup

After the one-time initial step of getting the TCP/IP address assigned to the ECC through the CM display, the ECC can, from that point on, have its TCP/IP setup changed with HTML pages and a standard web browser. The following is the information used for the TCP/IP setup.

TABLE 17

TCP/IP Setup Parameters

| Register | HiByte | LoByte |
|---|---|---|
| 500 | IP Address 1st Octet (0-255) | IP Address 2nd Octet (0-255) |
| 501 | IP Address 3rd Octet (0-255) | IP Address 4th Octet (0-255) |
| 502 | IP Sub-net Mask 1st Octet (0-255) | IP Sub-net Mask 2nd Octet (0-255) |

TABLE 17-continued

TCP/IP Setup Parameters

| Register | HiByte | LoByte |
|---|---|---|
| 503 | IP Sub-net Mask 3rd Octet (0-255) | IP Sub-net Mask 4th Octet (0-255) |
| 504 | IP Router Address 1st Octet (0-255) | IP Router Address 2nd Octet (0-255) |
| 505 | IP Router Address 3rd Octet (0-255) | IP Router Address 4th Octet (0-255) |
| 506 | Ethernet physical connection (0 = UTP, 1 = Fiber) | |

An Ethernet TCP/IP Setup HTML page will show communication settings. An "Update" button will not be seen if the user has "view only" access.

HTML RS485 Device Definition Setup

Keeping in mind that the user should have to do as little setup as possible, all the devices on the daisy chain normally do not have to be defined. The ECC will be designed to function primarily as a passive Gateway. This means that the ECC will be able to pass through all Ethernet messages to the RS485 daisy chain based on the Ethernet protocol/format that the message was made. There are, however, scenarios in which this technique will not work, and the RS485 device must be defined so the ECC will be able to translate from one protocol to another. The devices that have to be selectively defined are PowerLogic protocol devices. PowerLogic protocol devices only have to be defined when a user wishes to communicate to them with the Ethernet protocol ModbusTCP. There will be a default list of 16 available device identification slots in the setup page interface for device definitions that will consist of an RS485 address and a protocol associated with it. The first entry will always show the slave address of the CM the ECC is inserted into. The following table shows the information used for defining a device.

TABLE 18

RS485 Device Setup Parameters

| Register | HiByte | LoByte |
|---|---|---|
| 542 | RS485 Device Definitions - Protocol (3 = PowerLogic, 8 = Modbus) | RS485 Device Definitions - Address (0-254) |
| 543-604 | 62 more registers for up to 62 more Device definitions | |
| 605 | Number of viewable defined devices, includes CM that the ECC is attached to (2-62) | |

One thing to note, the ECC will use the LoByte of these registers to build the route of 30, 130, x to communicate to daisy-chained PowerLogic slave devices. Otherwise it will be used as the daisy-chained Modbus/Jbus slave ID.

A RS485 Device Setup HTML page will be provided. An "Update" button will not be seen if the user has "view only" access.

HTML RS485 Setup

The RS485 Setup information will include baud rate, parity, and port mode. The following table shows the storage format of this setup information.

TABLE 19

RS485 Setup Parameters

| Register | HiByte | LoByte |
|---|---|---|
| 512 | RS485 Baud Rate (1200, 2400, 4800, 9600, 19200, 38400) | |
| 513 | RS485 Parity (0 = none, 2 = even) | RS485 Mode (0 = 4-wire Smart, 1 = 2-wire Smart) |

An RS485 Serial Port Setup HTML page will show communications settings. An "Update" button will not be seen if the user has "view only" access.

HTML Remote Device Connection Setup

For sub-net initiated communications (the scenario where a serial master utilizes the ECC's RS485 port to gain access to remote locations/devices on the Ethernet, or the CM utilizes the ECC to gain access to remote locations/devices on the Ethernet), there has to be a way to define the remote nodes' locations. The ECC will have the ability to define up to ten remote Ethernet node locations. Also, the ECC will have the ability to define and associate up to eighty devices with these remote nodes. The following table is the format for the storage of the remote node/device information.

TABLE 20

Remote Device Connection Setup Parameters

| Registers | HiByte | LoByte |
|---|---|---|
| 606 | Associated Remote Node ID (0-9) | Remote Node Connection Type (1 = MMS SyMax format Port 1<br>2 = MMS SyMax format Port 2<br>3 = MMS Modbus format Port 1<br>4 = MMS Modbus format Port 2<br>5 = ModbusTCP) | Device Address 100's ID to be used in the Ethernet transaction (0-247) |
| 607-685 | 79 more registers for remote devices address 101 through 179 | |
| 686 | Remote Node ID 0 IP Address 1st Octet (0-255) | Remote Node ID 0 IP Address 2nd Octet (0-255) |
| 687 | Remote Node ID 0 IP Address 3rd Octet (0-255) | Remote Node ID 0 IP Address 4th Octet (0-255) |
| 688-705 | 18 more registers worth for remote node IDs 1 through 9 | |

The device initiating the communications will have to address to the ECC using addresses 100 through 179. These addresses will then serve as an identifier to "lookup" the information in that identifier's location. For Modbus initiators, the ECC will use the slave ID. For SyMax initiators, the ECC will use the last drop in the route. The information found in the location will then be used to make the Ethernet transaction. The following table shows the values for the connection types.

TABLE 21

Remote Node Connection Types

| Remote Node Connection Type | Description |
|---|---|
| 1 | MMS SyMax format Port 1 |
| 2 | MMS SyMax format Port 2 |
| 3 | MMS Modbus format Port 1 |
| 4 | MMS Modbus format Port 2 |
| 5 | ModbusTCP |

A Remote Device Connections Setup HTML page will be provided. The Add/Change and Delete sections of the page will not be seen if the user has "view only" access.

HTML MMS/ModbusTCP Server Security Setup

The ECC can allow for the MMS/ModbusTCP server connections to have definable client access. This means that the IP addresses of the MMS/ModbusTCP clients will have to be defined in the ECC before the ECC will allow access for communications. This feature can be "turned on" in one of two ways. The first way is to turn it on so that all clients attempting to connect have read only access except for the defined clients that will have full access. The other way is to turn it on so all clients attempting to connect have no access except for the defined clients that will have a definable read only or full access. The ECC will have the ability to define ten clients.

Note: this mechanism works well until multiple clients access the ECC by way of a TCP/IP proxy server. In this scenario, all the clients would be connecting to the ECC with the same IP address (the one of the proxy server). Thus, the ECC would be checking access levels for multiple clients based on a single TCP/IP address.

The following table shows the format for the information for the client security access.

TABLE 22

MMS/Modbus TCP Security Setup Parameters

| Register | HiByte | LoByte |
|---|---|---|
| 706 | Client IP Address 0-1st Octet (0-255) | Client IP Address 0-2nd Octet (0-255) |
| 707 | Client IP Address 0-3rd Octet (0-255) | Client IP Address 0-4th Octet (0-255) |
| 708-725 | 18 more registers for client IP addresses 1 through 9 | |
| 726 | Bits 15 and 14 signify how the security is turned on or if it is turned off.<br>(00 = Security off<br>01 = Security on, all undefined clients have read only access and defined clients have automatic full access<br>10 = Security on, all undefined clients have no access and defined clients must have access level defined) | Bit 0 represents client 0, bit 1 represents client 1, through bit 9.<br>(0 = Full Access, 1 = Read Only Access, these bits are ignored if bits 15 and 14 = 10) |

A MMS/Modbus TCP Security Setup HTML page will be provided. The "Update Settings" button will not be seen if the user has "view only" access.

HTML ECC Advanced Parameters Setup

The ECC will have an advanced parameters setup page that will be accessible by the administrator password only. This setup page will allow for advanced users to "tweak" ECC timing values that normally should never be changed. The administrator will also be able to change the default language the ECC will use at the login page. The following table shows the storage format for these values.

TABLE 23

Advanced Setup Parameters

| Register | HiByte | LoByte |
|---|---|---|
| 507 | ModbusTCP Client Timeout in seconds (5-60) | MMSTCP Client Timeout in seconds (5-60) |
| 508 | HTML Access token expiration time in minutes (1-255) | |
| 509 | RS485 Timeout in seconds (3-10) | DPR Timeout in seconds (3-10) |
| 510 | CM/RS485 Time Synchronization Interval in seconds (0 = disabled, 30-65535) | |
| 511 | HTML default language type (0 = English, 1 = French, 2 = Spanish) | |

HTML Diagnostics View

The ECC will have the ability to accumulate diagnostics information for display to the user for troubleshooting or performance knowledge. Also, the ECC version information will be shown here. The counters and watermarks will be volatile and are shown in the following table.

TABLE 24

| ECC Diagnostic Counters/Watermarks |
|---|
| RS485 Timeouts |
| RS485 Checksum Errors |
| RS485 Protocol Errors |
| RS485 Outbound Read Messages |
| RS485 Inbound Read Messages |
| RS485 Outbound Write Messages |
| RS485 Inbound Write Messages |
| Dual Port Ram Timeouts |
| Dual Port Ram Checksum Errors |
| Dual Port Ram Protocol Errors |
| Dual Port Ram Outbound Read Messages |
| Dual Port Ram Inbound Read Messages |
| Dual Port Ram Outbound Write Messages |
| Dual Port Ram Inbound Write Messages |
| MMS Timeouts (Future) |
| MMS Protocol Errors (Future) |
| MMS Outbound Read Messages (Future) |
| MMS Inbound Read Messages (Future) |
| MMS Outbound Write Messages (Future) |
| MMS Inbound Write Messages (Future) |
| MMS Inbound Connections (Future) |
| MMS Outbound Connections (Future) |
| MMS Active Inbound Connections (Future) |
| MMS Active Outbound Connections (Future) |
| MMS Maximum Inbound Connections (Future) |
| MMS Maximum Outbound Connections (Future) |
| ModbusTCP Timeouts |
| ModbusTCP Protocol Errors |
| ModbusTCP Outbound Read Messages |

TABLE 24-continued

| ECC Diagnostic Counters/Watermarks |
|---|
| ModbusTCP Inbound Read Messages |
| ModbusTCP Outbound Write Messages |
| ModbusTCP Inbound Write Messages |
| ModbusTCP Inbound Connections |
| ModbusTCP Outbound Connections |
| ModbusTCP Active Inbound Connections |
| ModbusTCP Active Outbound Connections |
| ModbusTCP Maximum Inbound Connections |
| ModbusTCP Maximum Outbound Connections |
| Ethernet CRC Errors |
| Ethernet Alignment Errors |
| Ehernet Code Errors |
| Ethernet Long Frame Errors |
| Ethernet Short/Runt Frame Errors |
| Ethernet Maximum Collision |

An HTML Diagnostics View page will be provided. A "Reset" button will not be seen if the user has "view only" access.

Multilingual HTML

To be able to have the ECC available outside the United States and even more acceptable within, it will need to have all displays available in English, French, and Spanish. The user may choose a language for the browser session at login. The default language selection at login will be English, but the default language may be changed by entering the Advanced Setup HTML page with the administrator password. This means that all parts of the ECC firmware that has viewable strings will have to be designed in such a fashion to be displayed in multiple languages. The following table shows the storage of the HTML language type.

TABLE 25

HTML Default Language

| Register | HiByte | LoByte |
|---|---|---|
| 511 | HTML default language type (0 = English, 1 = French, 2 = Spanish) | |

A Login HTML page will be provided pertaining to being Multilingual.

HTML Home Page

The user will be transferred to the ECC home page after the login. Only the links that the user has access to will appear in the list.

HTML Real Time Data Device Tables

The ECC will have the capability to show limited, real time, tabular data from the attached devices to the users in the form of HTML pages. These pages will include one static page for viewing information from the CM the ECC is inserted into and the possibility for up to five custom/downloadable HTML pages for viewing devices on the local RS485 daisy chain. These pages will be stored in the CM that the ECC is inserted into and must not exceed 20 kilobytes in size each.

HTML CM Instantaneous Readings View

A CM device HTML real-time data table page will be configurable by the administrator password for view only or no access.

HTML Custom Device Readings Tables

The custom device tables will be available for use preferably by our Engineering Services group or by users very knowledgeable in the realm of HTML and JavaScript. The pages will be written in HTML with special delimiters that will tell the ECC to dynamically get register information from a device. Great care will have to be taken by the page author to try to get the optimal performance out of these pages and to keep the sizes within the allowed range. The delimiters at the beginning (PL_) and end (_PL) of a string signify to the ECC to parse this string and dynamically fill it with register data. The following Table 26 is a table of the supported PowerLogic tags and also, an HTML example of how they could be used.

TABLE 26

PowerLogic HTML Tags

| Function Code | Function Name | PowerLogic Tag |
|---|---|---|
| 0 | SyMax Block Read - Registers | <DeviceID>^<RegisterAddress>[<NumberOfRegisters>] example tag =PL_1^1003[5]_PL example of data returned = 85,86,84,25,56 |
| 4 | SyMax Scattered | <DeviceID>^<RegisterAddress1>,<RegisterAddress2>,etc |

TABLE 26-continued

PowerLogic HTML Tags

| Function Code | Function Name | PowerLogic Tag |
|---|---|---|
| | Read - Registers | example tag = PL_1^1003,1004,1005,1006,1007_PL example of data returned = 85,86,84,25,56 |
| 3 | Modbus Block Read - Holding Registers | <DeviceID>^H<RegisterAddress>[<NumberOfRegisters>] example tag = PL_1^H1003[5]_PL example of data returned = 85,86,84,25,56 |
| 4 | Modbus Block Read - Input Registers | <DeviceID>^I<RegisterAddress>[<NumberOfRegisters>] example tag = PL_1^I1003[5]_PL example of data returned = 85,86,84,25,56 |
| 100 | Modbus Scattered Read - Holding Registers | <DeviceID>^S<RegisterAddress1>,<RegisterAddress2>,etc example tag = PL_1^S1003,1004,1005,1006,1007_PL example of data returned = 85,86,84,25,56 |

The following source code is one example of implementing Power Logic Tags in Javascript inside an HTML page.

Source:

```
<html>
<head>
<META HTTP-EQUIV="refresh" CONTENT="5">
<title>CM2350 - Slave Device 3</title>
</head>
<body>
<form name="view_form">
    <p align="center">
        <input type = "text" name = "time_spot" size = "40">
        <table border="1" width="600">
            <tr>
                <td width="600"><p align="center"><font size="4"><b>CM2350 - Slave
                Device 3</b></font></p>
                </td>
            </tr>
        </table>
        <table border="1" width="600">
            <tr>
                <td width="300">
                    <p align="center">Frequency</p>
                </td>
                <td align="center" width="90"><p align="center"><input
                type="text" size="5" name="frequency"></p>
                <td width="100">
                    <p align="center">Hz</p>
                </td>
            </tr>
            <tr>
                <td width="300">
                    <p align="center">Current Phase A</p>
                </td>
                <td align="center" width="90"><p align="center"><input
                type="text" size="5" name="currentphasea"></p>
                <td width="100">
                    <p align="center">Amps</p>
                </td>
            </tr>
            <tr>
                <td width="300">
                    <p align="center">Current Neutral</p>
                </td>
                <td align="center" width="90"><p align="center"><input
                type="text" size="5" name="currentneutral"></p>
```

```
            <td width="100">
                <p align="center">Amps</p>
            </td>
        </tr>
        <tr>
            <td width="300">
                <p align="center">Current Ground</p>
            </td>
            <td align="center" width="90"><p align="center"><input
            type="text" size="5" name="currentground"></p>
            <td width="100">
                <p align="center">Amps</p>
            </td>
        </tr>
    </table>
<br><HR SIZE="1" width="66%"><CENTER><font face="Times Roman"
size="2">Copyright © 2000 SchneiderElectric. All rights
reserved.</font></CENTER>
</form>
<script language="JavaScript">
function ShowFreq( )
{
    Registers = [PL__3^2020,2021,2022,2025,1001,1003,1006,1007__PL];
    ScaleFactorA = Registers[0];
    ScaleFactorB = Registers[1];
    ScaleFactorC = Registers[2];
    ScaleFactorF = Registers[3];
    Frequency = Registers[4];
    CurrentPhaseA = Registers[5];
    CurrentNeutral = Registers[6];
    CurrentGround = Registers[7];
    ScaleFactorAMultiplier = 0;
    ScaleFactorBMultiplier = 0;
    ScaleFactorCMultiplier = 0;
    ScaleFactorFMultiplier = 0;
    TheTime = new Date( );
    switch (ScaleFactorA)
    {
        case −2:
            ScaleFactorAMultiplier = 0.01;
            break;
        case −1:
            ScaleFactorAMultiplier = 0.1;
            break;
        case 1:
            ScaleFactorAMultiplier = 10;
            break;
        default:
            ScaleFactorAMultiplier = 1;
            break;
    }
    switch (ScaleFactorB)
    {
        case −2:
            ScaleFactorBMultiplier = 0.01;
            break;
        case −1:
            ScaleFactorBMultiplier = 0.1;
            break;
        case 1:
            ScaleFactorBMultiplier = 10;
            break;
        default:
            ScaleFactorBMultiplier = 1;
            break;
    }
    switch (ScaleFactorC)
    {
        case −2:
            ScaleFactorCMultiplier = 0.01;
            break;
        case −1:
            ScaleFactorCMultiplier = 0.1;
            break;
        case 1:
            ScaleFactorCMultiplier = 10;
            break;
        default:
            ScaleFactorCMultiplier = 1;
```

-continued

```
        break;
    }
    switch (ScaleFactorF)
    {
        case -1:
            ScaleFactorFMultiplier = 0.1;
            break;
        default:
            ScaleFactorFMultiplier = 0.01;
            break;
    }
    Frequency *= ScaleFactorFMultiplier;
    CurrentPhaseA *= ScaleFactorAMultiplier;
    if (CurrentNeutral == -32768)
        CurrentNeutral = "N/A";
    else
        CurrentNeutral *= ScaleFactorBMultiplier;
    if (CurrentGround == -32768)
        CurrentGround = "N/A";
    else
        CurrentGround *= ScaleFactorCMultiplier;
    document.view_form.frequency.value = Frequency;
    document.view_form.currentphasea.value = CurrentPhaseA;
    document.view_form.currentneutral.value = CurrentNeutral;
    document.view_form.currentground.value = CurrentGround;
    document.view_form.time_spot.value = TheTime;
}
ShowFreq( );
</script>
</body>
</html>
```

ModbusTCP Server

The ECC will be able to provide the ModbusTCP server functionality to allow external ModbusTCP clients access to the ECC's attached slave devices and the CM the ECC is inserted into. The ECC will post TCP/IP connection listens on TCP port 502. The ECC will allow a maximum often ModbusTCP clients to connect at any given time.

The following table shows the supported ModbusTCP function codes the ECC will allow.

TABLE 27

Modbus TCP Server Function Codes

| Function Code | Sub-function Code | Description |
|---|---|---|
| 1 | X | Block Read - Coil Status |
| 2 | X | Block Read - Input Coil Status |
| 3 | X | Block Read - Holding Registers |
| 4 | X | Block Read - Input Registers |
| 5 | X | Single Write - Coil |
| 6 | X | Single Write - Holding Register |
| 16 | X | Block Write - Holding Registers |
| 20 | X | Block Read - General Reference/File |
| 21 | X | Block Write - General Reference/File |
| 100 | 4 | Scattered Read - Holding Registers |
| 101 | 50 | Set Time |
| 102 | X | Security Operations |

MMSTCP Server

The ECC will be able to provide the MMSTCP (RFC-1006) server functionality to allow external PowerLogic compatible MMSTCP clients access to the ECC's attached slave devices. The ECC will allow a maximum of ten MMSTCP connections at any given time. The ECC will post MMSTCP connection listens on TCP port 102 with the MMS parameters in the following table.

TABLE 28

MMSTCP Server Connect Parameters

| MMS Parameter | Value |
|---|---|
| AP Title | 0 0 00 0 |
| AP Invoke ID | 0 |
| AE Qualifier | 0 |
| AE Invoke ID | 0 |
| Psel | 00 00 00 02 |
| Ssel | 00 01 |
| Tsel | 00 01 |

MMSTCP Services

The following table shows the MMS services supported in the ECC and gives a slight definition of how each is used.

TABLE 29

ECC Supported MMSTCP Services

| MMS Service | Description |
|---|---|
| Initiate | The ECC responds to all Initiate indications and is able to initiate connections for sub-net initiated communications. |
| Conclude | The ECC is able to respond to a Conclude indication and is able to conclude a connection in the case of inactivity on a channel or a request from sub-net initiated communications. |
| Abort | The ECC can respond to an Abort indication and generate a serial error code, if needed, in the case of sub-net initiated communications. |
| Cancel | The ECC responds to a Cancel by generating a serial error code, if needed, in the case of sub-net initiated communications. |
| Reject | The ECC can receive a Reject indication from another device and generate a serial error code, if needed, in the case of sub-net initiated communications. |

TABLE 29-continued

ECC Supported MMSTCP Services

| MMS Service | Description |
| --- | --- |
| Identify | The ECC returns the appropriate device information (vendor name, model, and firmware version) in response to an Identify indication. |
| Variable Read/Write | The ECC responds to data access requests for symbolically addressed variables Additionally, the ECC accepts serial read/write requests from a sub-net initiating device, converts them to a MMS symbolic address request, and returns the data appropriately. |

MMSTCP Server Security Backwards Compatibility

Due to the new IP connection-based security implementation, the ECC will not need to support the old security scheme implemented in existing EGWs. This should not cause any problems in systems still needing security or even in existing systems where an ECC is installed with other EGWs. The new mechanism in the ECC can still be utilized in conjunction with the old mechanism in the EGWs with no problems.

MMSTCP Symbolic Variable Strings

Character-based symbolic addressing will be used for data access. The basic format will be a two-part address separated by a "^". The first part is the end Device ID; the second part is protocol-specific. The following table shows the representation of each of the MMSTCP symbolic variable representations of the sub-network requests.

TABLE 30

MMSTCP SyMax Symbolic Variable Formats

| SyMax Function Code | Name | SyMax Format for MMS |
| --- | --- | --- |
| 0 | Block Read - Registers | <DeviceID>^<RegisterAddress>[<NumberOfRegisters>], *, |
| 2 | Block Write - Registers | <DeviceID>^<RegisterAddress>[<NumberOfRegisters>], *, |
| 4 | Scattered Read - Registers | <DeviceID>^<RegisterAddress>, <DeviceID>^<RegisterAddress>, |
| 4 | Record Read - File | <DeviceID>^<RegisterAddress>[<NumberOfRegisters>], <DeviceID>^RecordNumber[r] |

TABLE 31

MMSTCP Modbus/Jbus Symbolic Variable Formats

| Modbus/Jbus Function Code | Name | Modbus/Jbus Format for MMS |
| --- | --- | --- |
| 1 | Block Read - Coil Status | <DeviceID>^C<CoilAddress>[<NumberOfCoils>], *, |
| 2 | Block Read - Input Coil Status | <DeviceID>^D<CoilAddress>[<NumberOfCoils>], *, * |
| 3 | Block Read - Holding Registers | <DeviceID>^H<RegisterAddress>[<NumberOfRegisters>], *, * |
| 4 | Block Read - Input Registers | <DeviceID>^I<RegisterAddress>[<NumberOfRegisters>] *, |
| 5 | Single Write - Coil | <DeviceID>^C<CoilAddress> |
| 6 | Single Write - Register | <DeviceID>^H<RegisterAddress> |
| 16 | Block Write - Holding Registers | <DeviceID>^H<RegisterAddress>[<NumberOfRegisters>], *, * |
| 20 | Block Read - General Reference/File | <DeviceID>^F<RegisterAddress>[<NumberOfRegisters>] <FileNumber>, *, * |
| 21 | Block Write - General Reference/File | <DeviceID>^F<RegisterAddress>[<NumberOfRegisters>] <FileNumber>, *, * |
| 100 | Scattered Read - Holding Registers | <DeviceID>^S<RegisterAddress>, <DeviceID>^S<RegisterAddress>, <DeviceID>^S<RegisterAddress> |
| 102 | Security Operations | <DeviceID>^Z<SecurityCode>^ regular formats minus device ID |

MMSTCP Symbolic Variable String Examples

A SyMax Block Read of registers 1002 through 1004 from a SyMax device defined as Device ID 12 in the ECC should be done with a single MMS read of a list of 3 individual symbolic variables in the following format.

| | |
|---|---|
| 12^1002[3] | = Variable 1 |
| * | = Variable 2 |
| * | = Variable 3 |

A SyMax Block Write of registers 6800 through 6802 from a SyMax device defined as Device ID 12 in the ECC should be done with a single MMS write of a list of 4 individual symbolic variables in the following format.

| | | |
|---|---|---|
| 12^6800[3] | = Variable 1 | −32768 to 32767 for data |
| * | = Variable 2 | −32768 to 32767 for data |
| * | = Variable 3 | −32768 to 32767 for data |
| * | = Variable 4 with mask value to be applied to the written registers' data | |

Note that there is (1+NumberOfRegisters) variables. This is because the last variable's data must be used as a mask value in the SyMax operation. This last variable's data is usually FFFF because all the bits for all the values are to be written into the associated registers. The FFFF value can be changed if only certain bits are to be written.

A SyMax Scattered Read of registers 1002, 1004, 1008 from a SyMax device defined as Device ID 12 in the ECC should be done with a single MMS read of a list of 3 individual symbolic variables in the following format:

| | |
|---|---|
| 12^1002 | = Variable 1 |
| 12^1004 | = Variable 2 |
| 12^1008 | = Variable 3 |

A Modbus/Jbus Block Read of coils 20 through 22 from a Modbus/Jbus device defined as Device ID 12 in the ECC should be done with a single MMS read of a list of 3 individual symbolic variables in the following format:

| | |
|---|---|
| 12^C20[3] | = Variable 1 |
| * | = Variable 2 |
| * | = Variable 3 |

A Modbus Block Read of Input coils 100020 through 100022 from a Modbus device defined as Device ID 12 in the ECC should be done with a single MMS read of a list of 3 individual symbolic variables in the following format:

| | |
|---|---|
| 12^D20[3] | = Variable 1 |
| * | = Variable 2 |
| * | = Variable 3 |

A Jbus Block Read of Input coils 20 through 22 from a Jbus device defined as Device ID 12 in the ECC should be done with a single MMS read of a list of 3 individual symbolic variables in the following format:

| | |
|---|---|
| 12^D20[3] | = Variable 1 |
| * | = Variable 2 |
| * | = Variable 3 |

A Modbus Block Read of Holding registers 401002 through 401004 from a Modbus device defined as Device ID 12 in the ECC should be done with a single MMS read of a list of 3 individual symbolic variables in the following format:

| | |
|---|---|
| 12^H1002[3] | = Variable 1 |
| * | = Variable 2 |
| * | = Variable 3 |

A Jbus Block Read of Holding registers 1002 through 1004 from a Jbus device defined as Device ID 12 in the ECC should be done with a single MMS read of a list of 3 individual symbolic variables in the following format:

| | |
|---|---|
| 12^H1002[3] | = Variable 1 |
| * | = Variable 2 |
| * | = Variable 3 |

A Modbus Block Read of Input registers 301002 through 301004 from a Modbus device defined as Device ID 12 in the ECC should be done with a single MMS read of a list of 3 individual symbolic variables in the following format.

| | |
|---|---|
| 12^I1002[3] | = Variable 1 |
| * | = Variable 2 |
| * | = Variable 3 |

A Jbus Block Read of Input registers 1002 through 1004 from a Jbus device defined as Device ID 12 in the ECC should be done with a single MMS read of a list of 3 individual symbolic variables in the following format:

| | |
|---|---|
| 12^I1002[3] | = Variable 1 |
| * | = Variable 2 |
| * | = Variable 3 |

A Modbus/Jbus Single Coil Write to coil 20 to a Modbus/Jbus device defined as Device ID 12 in the ECC should be done with a single MMS write of a single symbolic variable in the following format:

| | | |
|---|---|---|
| 12^C20 | = Variable 1 | 1 or 0 for data |

A Modbus Single Register Write to register 406800 to a Modbus device defined as Device ID 12 in the ECC should be done with a single MMS write of a single symbolic variable in the following format:

| | | |
|---|---|---|
| 12^H6800 | = Variable 1 | −32768 to 32767 for data |

A Jbus Single Register Write to register 6800 to a Jbus device defined as Device ID 12 in the ECC should be done with a single MMS write of a single symbolic variable in the following format:

| | | |
|---|---|---|
| 12^H6800 | = Variable 1 | −32768 to 32767 for data |

A Modbus Block Write to registers 406800 to 406802 to a Modbus device defined as Device ID 12 in the ECC should be done with a single MMS write of a list of 3 individual symbolic variables in the following format:

| | | |
|---|---|---|
| 12^H6800[3] | = Variable 1 | −32768 to 32767 for data |
| * | = Variable 2 | −32768 to 32767 for data |
| * | = Variable 3 | −32768 to 32767 for data |

A Jbus Block Write to registers 6800 to 6802 to a Jbus device defined as Device ID 12 in the ECC should be done with a single MMS write of a list of 3 individual symbolic variables in the following format:

| | | |
|---|---|---|
| 12^H6800[3] | = Variable 1 | −32768 to 32767 for data |
| * | = Variable 2 | −32768 to 32767 for data |
| * | = Variable 3 | −32768 to 32767 for data |

A Modbus/Jbus Read from General Reference File 1 registers 2 to 4 from a Modbus/Jbus device defined as Device ID 12 in the ECC should be done with a single MMS read of a list of 3 individual symbolic variables in the following format:

| | |
|---|---|
| 12^F2[3]1 | = Variable 1 |
| * | = Variable 2 |
| * | = Variable 3 |

A Modbus/Jbus Write to General Reference File 1 registers 2 to 4 to a Modbus/Jbus device defined as Device ID 12 in the ECC should be done with a single MMS write of a list of 3 individual symbolic variables in the following format:

| | | |
|---|---|---|
| 12^F2[3]1 | = Variable 1 | −32768 to 32767 for data |
| * | = Variable 2 | −32768 to 32767 for data |
| * | = Variable 3 | −32768 to 32767 for data |

A Modbus Scattered Read of registers 401002, 401004, 401008 from a Modbus device defined as Device ID 12 in the ECC should be done with a single MMS read of a list of 3 individual symbolic variables in the following format:

| | |
|---|---|
| 12^S1002 | = Variable 1 |
| 12^S1004 | = Variable 2 |
| 12^S1008 | = Variable 3 |

A Jbus Scattered Read of registers 1002, 1004, 1008 from a Jbus device defined as Device ID 12 in the ECC should be done with a single MMS read of a list of 3 individual symbolic variables in the following format:

| | |
|---|---|
| 12^S1002 | = Variable 1 |
| 12^S1004 | = Variable 2 |
| 12^S1008 | = Variable 3 |

A Modbus Secured Scattered Read of registers 401002, 401004, 401008 from a Modbus device defined as Device ID 12 in the ECC should be done with a single MMS read of a list of 3 individual symbolic variables in the following format:

| | |
|---|---|
| 12^Z3546^S1002 | = Variable 1 |
| 12^Z3546^S1004 | = Variable 2 |
| 12^Z3546^S1008 | = Variable 3 |

ModbusTCP Client

The ECC will have the ability to initiate communications as a ModbusTCP client when configured to do so based on the Remote Device Connections Setup. The ECC will do all transactions based on a connection to TCP port 502 and will support the same Modbus function codes listed in the ModbusTCP Server Function Codes Section. Each read or write operation will be accompanied by a connect and a disconnect message over the Ethernet.

MMSTCP Client

The ECC will have the ability to initiate communications as a MMSTCP client when configured to do so based on the Remote Device Connections Setup The ECC will do all transactions based on a connection to TCP port 102 and will support the MMS functionality explained in the MMSTCP Services Section. Each read or write operation will be accompanied by a connect and a disconnect message over the Ethernet.

SNTP Server

The ECC will have the ability to listen on TCP port 123 for an SNTP server to send time synchronization information to the ECC. This information will then update the ECC's internal time and will allow this updated internal time to be used in the time synchronization mechanism which will update all the attached devices (CM and RS485) to the ECC on configurable intervals.

FTP Server

The ECC has the ability to act as an FTP server. This capability will allow the ECC to listen on the Ethernet at TCP port 21 for file transfers. Utilizing this capability will allow a good mechanism for quick downloadable ECC basic setup, downloadable ECC firmware updates, and downloadable custom device HTML tables.

FTP Download for Basic Setup

The ECC will have the ability to accept an FTP download to accomplish limited setup changes/additions. The initial setup of the ECC through the CM display must already be completed to get the ECC configured properly on the TCP/IP network prior to attempting the setup download. Most any desktop PC running Windows NT/95/98 and using TCP/IP will have the capability to FTP a setup file to the ECC. The setup file will be an ASCII text file with a list of strings for the ECC to execute. The user will have to open an FTP session from within the DOS prompt and "put/send" the text file to the ECC. The text file must be named "setup.txt" and the user must login to the ECC FTP server with the administrator password (user name is ignored by the ECC). The following table shows what each line in the text file should be.

TABLE 32

Basic Setup FTP File Format

| Line Number | Description |
|---|---|
| 1 | RS485 Port Baud Rate (1200, 2400, 4800, 9600, 19200, 38400) |
| 2 | RS485 Port Parity (0 = none, 2 = even) |
| 3 | RS485 Port Timeout in seconds (3-10) |
| 4 | RS485 Time Sync Interval in seconds (0 = disabled, 30-65535) |
| 5 | Device ID 2's RS485 Address (0-247) |
| 6 | Device ID 2's RS485 Protocol (4 = PowerLogic, 6 = Modbus, 11 = Jbus, any value other than these specified will remove this device from the list) |
| 7 | Device ID 3's RS485 Address (0-247) |
| 8 | Device ID 3's RS485 Protocol (4 = PowerLogic, 6 = Modbus, 11 = Jbus, any value other than these specified will remove this device from the list) |
| 66 | Through Device ID 32's info |

The following shows what an example setup text file would look like

```
9600
2
5
300
3
4
5
6
10
11
24
4
```

Note A "Wizard" application could be provided here to automatically generate this file for the user.

FTP Download for Firmware Update

The ECC will have the ability to accept an FTP transfer to accomplish a firmware download. The ECC must be configured properly on the TCP/IP network prior to attempting the firmware download. Most any desktop PC running Windows NT195/98 and using TCP/IP will have the capability to FTP the firmware file to the ECC. The user will have to open an FTP session from within the DOS prompt and "put/send" the firmware file to the ECC. The file will be named "firmware.bin" and the user must login to the ECC FTP server with the administrator password (user name is ignored by the ECC). The new firmware binary will be accepted by the ECC into DRAM space. Once the FTP transaction is complete, the firmware binary will be copied into flash, and the ECC will reset to load and run with the new image.

FTP Download for Custom Device View Tables (Future)

The ECC will have the ability to accept an FTP download to allow for five custom designed HTML device view pages. The ECC will be configured properly on the TCP/IP network prior to attempting the download. Most any desktop PC running Windows NT/95/98 and using TCP/IP will have the capability to FTP the file to the ECC. The HTML file will be an ASCII text file written in standard HTML language.

Note that it is up to the user to correctly construct the HTML page. The ECC will only confirm that there is a correct HTML title tag, and then accept the whole file as correct. Once the file is accepted, a link to the page will appear on the ECC Home page. The link name will be the page's title up to 32 characters.

The user will have to open an FTP session from within the DOS prompt and "put/send" the HTML file to the ECC. The user must login to the ECC FTP server with the administrator password (user name is ignored by the ECC). Once the file is accepted by the ECC, the HTML file's title will show up in the list on the ECC Home page.

Post FTP Download for Custom Device View Tables (Future)

The ECC will normally have the custom HTML pages loaded into DRAM at runtime. When a new one is downloaded, the ECC will update its image in DRAM then have to store the HTML page in a file in the CM. According to the CM Design Specification, the following table signifies each file for the pages.

TABLE 33

Downloadable HTML Page Storage

| File Type | Description | File Size | Record Size |
|---|---|---|---|
| 35 | HTML File #1 | Dynamic | Static |
| 36 | HTML File #2 | Dynamic | Static |
| 37 | HTML File #3 | Dynamic | Static |
| 38 | HTML File #4 | Dynamic | Static |
| 39 | HTML File #5 | Dynamic | Static |

Each downloadable HTML page will be buffered to fit the static record size. This means that the HTML page will be evenly divisible by 100 because each record size is limited to 100 bytes.

Serial Communications

The ECC will have the ability to have its single RS485 port utilized for communications in combinations of the following: 2-wire, 4-wire, multi-protocol, master, slave (Future). To try to keep with the goal of having the user do as little setup as possible, the goal of the ECC RS485 logistics will be to have only two modes of operation. These two modes will be able to be as "dynamic" as possible and respond/react to the protocols supported as needed. These two modes will be called "4-wire Smart Mode" and "2-wire Smart Mode".

4-wire Smart Mode

The 4-wire Smart Mode will be the default and primary setup for the ECC RS485 communications. This mode will allow for fall-duplex bi-directional communications when needed. The ECC will be able to "know" when the port is being utilized as a slave or master by reacting to what is connected to it during communications. This "knowledge" also includes the ability to determine between SyMax, Modbus, and Jbus protocols on the fly. This ability helps the ECC adept even better to the use of "mixed-protocol" devices.

2-wire Smart Mode

The 2-wire Smart Mode will be the secondary setup for the ECC RS485 communications. This mode will allow for half-duplex communications only. This means that all the devices (master and slaves) together share the communication signals and can only communicate one at a time. In this mode, just like the 4-wire Smart Mode, the ECC will be able to "know" when the port is being utilized as a slave or master by reacting to what is connected to it during communications. This mode will accommodate Modbus/Jbus 2-wire communications only. This ability also helps ease the ECC setup for the user.

Inter-processor Communications

The primary purpose of the ECC is for high-speed communications to the CM the ECC is inserted into. This inter-processor communications will be based on a high-speed dual-port RAM interface between the bus of the ECC's processor and the bus of the CM's processor The actual speed of the communications will be determined during development/testing.

Inter-processor Communications Theory of Operation

The inter-processor communications will be based on a proprietary "flavor" of Modbus. This choice was made since the Modbus protocol is one already well adapted into both devices, and since the characteristics of the protocol fit the dual-port RAM interface fairly well. Because the CM will have the ability to initiate communications and cause a potential for full-duplex, bi-directional communications (collisions) through the dual-port RAM in the ECC, the dual-port RAM will have to be split into four main memory regions.

One half (upper half), from the point-of-view of the ECC, will be the incoming side for communications from the CM. This half will then be split into two equal memory regions that will be designated for incoming commands and incoming replies. The other half (lower half), again from the point-of-view of the ECC, will be the outgoing side for communications to the CM. This half will also be split into two more equal memory regions that will be designated for outgoing commands and outgoing replies.

To ease the message management on the CM and the ECC, no more than one command message per direction should be outstanding at any given time. There may also need to be "control" messages between just the CM and the ECC for movement of specific types of data unknown to the "outside". In these cases, the CM and the ECC should use a Modbus slave ID of 255 in the Modbus command message to signify to the device receiving the message that it is a "control" message.

As previously mentioned, there will be a slight adaptation of the Modbus packet structure. There will be two bytes (one word) added as the first part of the message that will be the count of the bytes contained in the rest of the message. The rest of the message will then be a regularly formatted Modbus message. The ECC will read the CM's RS485 slave port address out of the CM at boot and that address will be used for MBTCP communications to the CM the ECC is inserted into.

After the ECC fills the appropriate region of the dual-port RAM with the appropriate message needed, the offset address of 0x7FF should be written with the appropriate interrupt ID to trigger an interrupt to the CM processor. Likewise, after the CM fills the appropriate region of the dual-port RAM with the appropriate message needed, the offset address of 0x7FE should be written with the appropriate interrupt ID to trigger an interrupt to the ECC processor.

Figure 9:
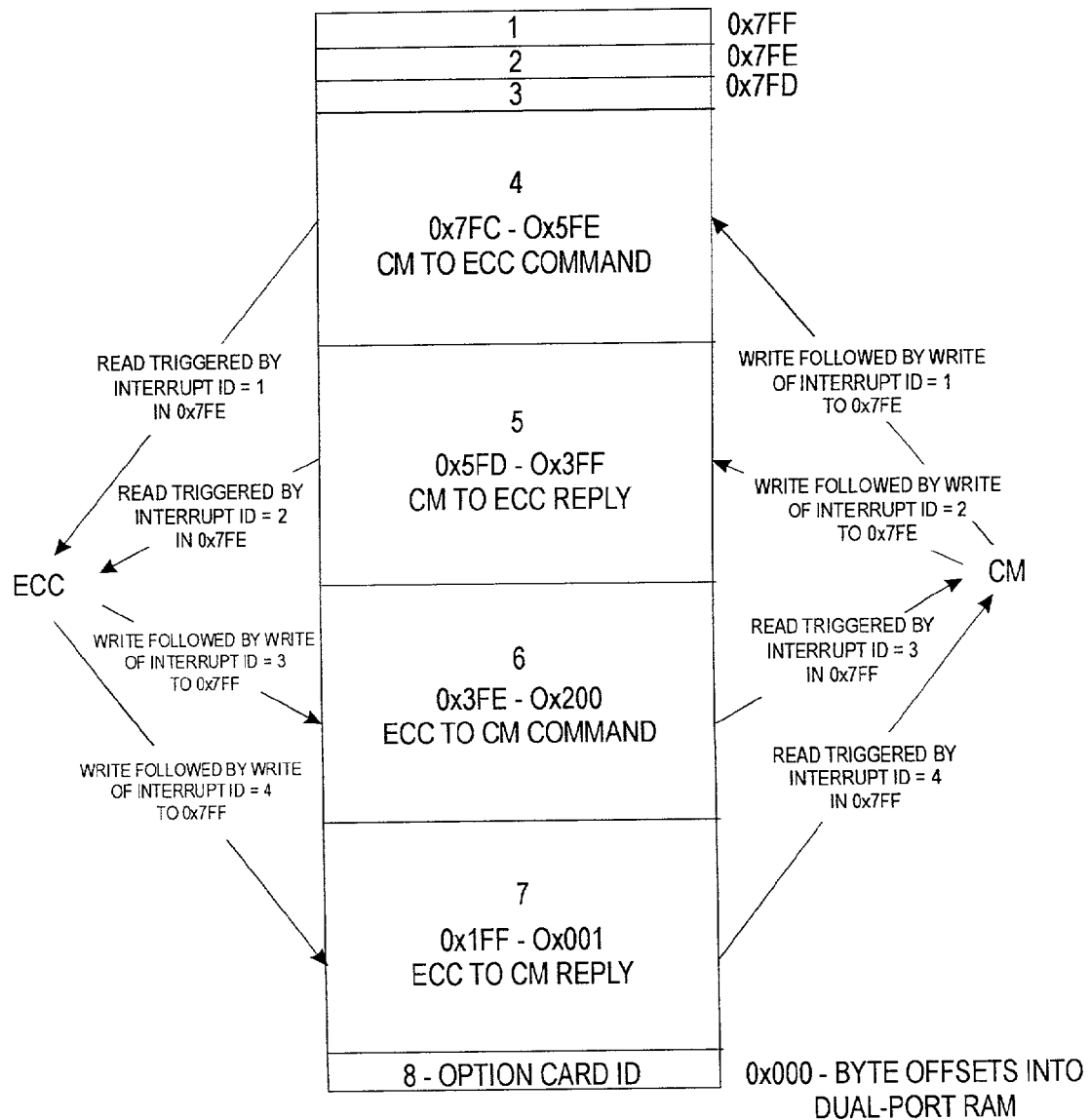
FIG. 9 shows a dual-port RAM memory map for an Ethernet communications device in accordance with one embodiment of the invention.

FIG. 9 shows the memory map of the dual-port ram followed by an explanation of each of the numbered memory regions.

TABLE 34

Dual-Port Ram Memory Region Descriptions

| Memory Region | Description |
|---|---|
| 1 | The ECC writes the interrupt ID here to trigger an interrupt to the CM. Or The CM reads this address after being triggered by the interrupt to see what the interrupt ID is. |
| 2 | The CM writes the interrupt ID here to trigger an interrupt to the ECC. Or The ECC reads this address after being triggered by the interrupt to see what the interrupt ID is. |
| 3 | Reserved |
| 4 | The ECC, after interrupt and reading the interrupt ID from 0x7FE, will read this memory region from offset 0x600 for number of bytes shown in 0x5FE and 0x5FF to get a Modbus command message from the CM. Or The CM, before writing the appropriate interrupt ID value in 0x7F, will write the Modbus command message in this memory region from offset 0x600 and write the number of bytes in the message into 0x5FE and 0x5FF. |
| 5 | The ECC, after interrupt and reading the interrupt ID from 0x7FE, will read this memory region from offset 0x401 for number of bytes shown in 0x3FF and 0x400 to get a Modbus reply message from the CM Or The CM, before writing the appropriate interrupt ID value in 0x7FE, will write the Modbus reply message in this memory region from offset 0x401 and write the number of bytes in the message into 0x3FF and 0x400. |
| 6 | The CM, after interrupt and reading the interrupt ID from 0x7FF, will read this memory region from offset 0x202 for number of bytes shown in 0x200 and 0x201 to get a Modbus command message from the ECC. Or The ECC, before writing the appropriate interrupt ID value in 0x7FF, will write the Modbus command message in this memory region from offset 0x202 and write the number of bytes in the message into 0x200 and 0x201. |
| 7 | The CM, after interrupt and reading the interrupt ID from 0x7FF, will read this memory region from offset 0x003 for number of bytes shown in 0x001 and 0x002 to get a Modbus reply message from the ECC. Or The ECC, before writing the appropriate interrupt ID value in 0x7FF, will write the Modbus reply message in this memory region from offset 0x003 and write the number of bytes in the message into 0x001 and 0x002. |
| 8 | Option Card Identification |

Table 35 shows the combinations for the flow of messages through the dual-port RAM and the associated interrupt ID.

TABLE 35

Dual-port RAM Logistics

| Direction | Interrupt ID | Description |
|---|---|---|
| Incoming Command (memory region 4) | 1 (command) | Incoming command from the CM to the ECC (designated by slave id 255), or from the CM to the ECC to be routed to the outside |
| Incoming Reply (memory region 5) | 2 (reply) | Incoming reply from the CM to the ECC (designated by slave id 255), or from the CM to the ECC to be routed to the outside |
| Outgoing Command (memory region 6) | 3 (command) | Outgoing command from the ECC to the CM (designated by slave id 255), or from the outside to be routed by the ECC to the CM |
| Outgoing Reply (memory region 7) | 4 (reply) | Outgoing reply from the ECC to the CM (designated by slave id 255), or from the outside to be routed by the ECC to the CM. |

Inter-processor Communications Boot-up Sequence

Because the entire ECC configuration will be stored in the CM the ECC is inserted into, the ECC will have to be able to get this information from the CM at every boot-up. Also, if the user changes the initial setup information (IP Address, IP Subnet Mask, IP Router, or Ethernet Physical Connection) via the CM display, the CM will have to re-boot the ECC to have the new settings take effect.

At initial power-up, the ECC will set its CM option card identifier in the lowest address of the dual-port RAM as soon as possible before starting any of the main firmware tasks. At this point, the ECC will finish its boot sequence based on the last known good initial setup information. This information will be held in the first thirteen bytes of the EEPROM based on the following Table 36.

TABLE 36

Last Known Good Boot State

| Byte Offset into EEPROM | Description |
|---|---|
| 0 | IP Address - 1st Octet |
| 1 | IP Address - 2nd Octet |
| 2 | IP Address - 3rd Octet |
| 3 | IP Address - 4th Octet |
| 4 | IP Sub-net Mask - 1st Octet |
| 5 | IP Sub-net Mask - 2nd Octet |
| 6 | IP Sub-net Mask - 3rd Octet |
| 7 | IP Sub-net Mask - 4th Octet |
| 8 | IP Router Address - 1st Octet |
| 9 | IP Router Address - 2nd Octet |
| 10 | IP Router Address - 3rd Octet |
| 11 | IP Router Address - 4th Octet |
| 12 | Ethernet Physical Connection |

After the completion of the boot sequence based on the last known good information, the ECC will then begin the first of a sequence of Modbus reads getting the basic ECC setup information from the CM If the ECC finds a difference between what it has as the last known good information and what the CM has as the initial setup information, the ECC will update its last known good information and request a reboot of the CM. Once there is a match between the initial setup information between the ECC and the CM, the ECC will finish its boot sequence with all the appropriate basic setup information and continue to request any advanced information (Custom HTML pages) from the CM.

CM Communications Card Identification

The CM option card identifier used by the ECC is defined by the CM and is the value of six according to the CM Design Specification. This number will be placed in the lowest offset of the dual-port RAM by the ECC as soon as possible during boot-up.

Manufacturing Parameters

The ECC will need some specific parameters set for each unit during manufacturing. Some of the parameters that appear to be needed at this time are the Organizationally Unique Identifier (OUI), the serial number, the model number, the hardware revision number, and the date of manufacture (DOM).

Organizationally Unique Identifier (OUI)

An OUI is a 24 bit globally unique assigned number referenced by various standards. An OUI is used in the family of 802 LAN standards (Ethernet, Token Ring, etc). The OUI defined in IEEE Std 802-1990 can be used to generate 48 bit Universal LAN MAC addresses to identify LAN and MAN stations uniquely, and Protocol Identifiers to identify public and private protocols. These are used in Local and Metropolitan Area Network applications. The relevant standards include CSMA/CD (IEEE Std 802.3, ISO 8802-3), Token Bus (IEEE Std 802.4, ISO 8802-4), Token Ring (IEEE Std 802.5, ISO/IEC 8802-5), IEEE Std 802.6 (ISO/IEC DIS 8802-6), and FDDI (ISO 9314-2).

The ECCs will carry Square D's IEEE OUI "signature" of 00-80-67. The Power Management Operations (PMO) has a range of the OUIs for Ethernet MAC addresses and will be 00-80-67-80-00-00 through 00-80-67-FF-FF-FF. This range gives PMO a total of 8,388,608 MAC addresses to distribute and be used among our Ethernet devices.

The unique MAC addresses will have to be able to be assigned to each individual ECC during manufacturing. There are a few possibilities to accomplish this. One possibility is to have the MAC assignment done by writing the EEPROM before board manufacture and/or have an EEPROM socket for removal of the EEPROM to have the ability to re-write if needed The other option would be to have firmware capabilities to set/change the MAC address when needed. This option requires more functionality in the firmware and also leaves open the potential of "lost" or duplicate MAC addresses. The following table shows the storage format of the MAC address in the EEPROM on the ECC.

TABLE 37

MAC Address Storage Map

| Byte Offset into EEPROM | Description |
|---|---|
| 13 | Byte one of the MAC address (most significant) |
| 14 | Byte two of the MAC address |
| 15 | Byte three of the MAC address |
| 16 | Byte four of the MAC address |
| 17 | Byte five of the MAC address |
| 18 | Byte six of the MAC address (least significant) |

Serial Number

Another piece of information that will need to be stored in the ECC EEPROM will be a serial number. Here again, there are a few possibilities to accomplish this. One possibility is to have the serial number assignment done by writing the EEPROM before board manufacture and/or have an EEPROM socket for removal of the EEPROM to have the ability to re-write if needed. Another option would be to have firmware capabilities to set/change the serial number when needed. A third option would be to come up with a scheme to drive a serial number from the MAC address. By having the MAC address set, the serial number would also inherently be set. The following table shows the storage format of the 32 bit value of the serial number in the EEPROM on the ECC

TABLE 38

Serial Number Storage Map

| Byte Offset into EEPROM | Description |
|---|---|
| 19 | Byte one of the Serial Number (most significant) |
| 20 | Byte two of the Serial Number |
| 21 | Byte three of the Serial Number |
| 22 | Byte four of the Serial Number (least significant) |

Model Number

Another piece of information that will need to be stored in the ECC EEPROM will be a model number. Here again, there are a few possibilities to accomplish this. One possibility is to have the model number assignment done by writing the EEPROM before board manufacture and/or have an EEPROM socket for removal of the EEPROM to have the ability to re-write if needed. The other option would be to have firmware capabilities to set/change the model number when needed. The following table shows the storage format of the 16 bit value of the model number in the EEPROM on the ECC.

TABLE 39

Model Number Storage Map

| Byte Offset into EEPROM | Description |
|---|---|
| 23 | Byte one of the Model Number (most significant) |
| 24 | Byte two of the Model Number (least significant) |

Hardware Revision Number

Another piece of information that will need to be stored in the ECC EEPROM will be a hardware revision number. Here again, there are a few possibilities to accomplish this. One possibility is to have the hardware revision number assignment done by writing the EEPROM before board manufacture and/or have an EEPROM socket for removal of the EEPROM to have the ability to re-write if needed. The other option would be to have firmware capabilities to set/change the hardware revision number when needed. The following table shows the storage format of the four ASCII characters that represent the hardware revision number in the EEPROM on the ECC.

TABLE 40

Model Number Storage Map

| Byte Offset into EEPROM | Description |
|---|---|
| 25 | ASCII character one of the Hardware Revision Number |
| 26 | ASCII character two of the Hardware Revision Number |
| 27 | ASCII character three of the Hardware Revision Number |
| 28 | ASCII character four of the Hardware Revision Number |

Date of Manufacture (DOM)

Another piece of information that will need to be stored in the ECC EEPROM will be a Date of Manufacture value. Here again, there are a few possibilities to accomplish this. One possibility is to have the date assignment done by writing the EEPROM before board manufacture and/or have an EEPROM socket for removal of the EEPROM to have the ability to re-write if needed. The other option would be to have firmware capabilities to set/change the date when needed. The following table shows the storage format of the date of manufacture in the EEPROM on the ECC.

TABLE 41

DOM Storage Map

| Byte Offset into EEPROM | Description |
|---|---|
| 29 | Month byte of the DOM |
| 30 | Day byte of the DOM |
| 31 | Year byte of the DOM, since 1900 |
| 32 | Hour byte of the DOM |
| 33 | Minute byte of the DOM |
| 34 | Seconds byte of the DOM |

Manufacture Process Info

The final piece of information that will need to be stored in the ECC EEPROM will be an area of memory that will be used as a "scratch pad" for use during Manufacturing. This area will be written during manufacturing/testing of each unit. The following table shows the region in the EEPROM dedicates for this purpose.

TABLE 42

Manufacturing Process Info Storage Map

| Byte Offset into EEPROM | Description |
|---|---|
| 35-74 | Manufacturing "scratch pad" |

Environmental

The ECC design will attempt to meet the same environmental requirements as the CM. This will prove difficult, however, due to the lack of availability of Industrial Ethernet components capable of doing the needed speeds/interfaces. The following table will show acceptable ranges for the environmental requirements that the ECC will attempt to meet.

TABLE 43

Environmental Requirements

| Description | Values |
|---|---|
| Operating Temperature Range | −40° C. to +70° C. |
| Storage Temperature Range | −40° C. to +85° C. |
| Humidity Rating | 5% to 95% rh (non-condensing) |
| Vibration | Equivalent to CM |

Agency Compliance

The ECC design will attempt to meet the same agency compliance as the CM. The following table shows the agency compliance that the ECC will attempt to meet.

TABLE 44

Agency Compliance

| Type | | Description |
|---|---|---|
| Electromagnetic Interference | Radiated Emissions | FCC Part 15 Class A/CE Heavy Industrial |
| Electromagnetic Interference | Conducted Emissions | FCC Part 15 Class A/CE Heavy Industrial |
| Electrostatic Discharge | Air Discharge | IEC pub 1000-4-2 level 4 |
| Immunity to Electrical Fast Transients | Transients | ANSI/IEEE C37.90A, IEC pub 1000-4-4 level 3 |
| Immunity to Electrical Fast Transients | Impulse Wave | IEC pub 1000-4-5 level 4 |
| Breakdown Voltage | Dielectric Withstand | UL 508, CSA C22.2-14-M1987, IEC pub 1000-4 |
| Immunity to Radiated Fields | RFI | IEC pub 801.3 level 4 |
| Safety | USA | UL 508 |
| Safety | Canada | CSA C22.2-14-M1987 |
| Safety | Europe | VDE/TUV Equivalent to UL508 |

System Manager Software Drivers

The ECC will be designed in such a way to be as completely compatible as possible with the existing SMS PowerLogic Network Server MMSTCP and ModbusTCP Drivers. This will allow the integration of the new communications device without major impact on SMS.

ECC Operating System

The operating system used in the ECC design will be the pSOSystem operating system from Integrated Solutions, Inc. (ISI). pSOSystem has been established as a leading real-time operating system (RTOS) for embedded applications. pSOSystem is a modular, high-performance, real-time operating system, designed specifically for embedded microprocessors. A few of the main components that will be utilized during development will be the pSOSystem pSOS+Real-time Multitasking Kernel, pNA+TCP/IP Protocol Stack, pREPC+ANSI C Standard Library, pROBE+, and pMONT+. All the firmware work will be done in ISI's pRISM+development environment. For detailed information on these pSOSystem and pRISM+components, refer to the ISI pSOSystem and pRISM+documentation.

ECC Register List

The ECC will have nearly all configuration data stored in the CM it is inserted into. The required storage size will need to be a minimum of 300 words (registers). The is the "quick list" of the registers.

TABLE 45

ECC Register List

| Register | HiByte | LoByte |
|---|---|---|
| 500 | IP Address $1^{st}$ Octet (0-255) | IP Address $2^{nd}$ Octet (0-255) |
| 501 | IP Address $3^{rd}$ Octet (0-255) | IP Address $4^{th}$ Octet (0-255) |
| 502 | IP Sub-net Mask $1^{st}$ Octet (0-255) | IP Sub-net Mask $2^{nd}$ Octet (0-255) |
| 503 | IP Sub-net Mask $3^{rd}$ Octet (0-255) | IP Sub-net Mask $4^{th}$ Octet (0-255) |
| 504 | IP Router Address $1^{st}$ Octet (0-255) | IP Router Address $2^{nd}$ Octet (0-255) |
| 505 | IP Router Address $3^{rd}$ Octet (0-255) | IP Router Address $4^{th}$ Octet (0-255) |
| 506 | Ethernet physical connection (0 = UTP, 1 = Fiber HD, 2 = Fiber FD) | |
| 507 | ModbusTCP Client Timeout in seconds (5-60) | MMSTCP Client Timeout in seconds (5-60) |
| 508 | HTML Access token expiration time in minutes (1-255) | |
| 509 | RS485 Timeout in seconds (3-10) | DPR Timeout in seconds (3-10) |
| 510 | CM/RS485 Time Synchronization Interval in seconds (0 = disabled, 30-65535) | |
| 511 | HTML default language type (0 = English, 1 = French, 2 = Spanish) | |
| 512 | RS485 Baud Rate (1200, 2400, 4800, 9600, 19200, 38400) | |
| 513 | RS485 Parity (0 = none, 2 = even) | RS485 Mode (1 = 2-wire Smart, 2 = 4-wire Smart) |
| 514 | Admin password ASCII character 1 | Admin password ASCII character 2 |
| 515 | Admin password ASCII character 3 | Admin password ASCII character 4 |
| 516 | Admin password ASCII character 5 | Admin password ASCII character 6 |
| 517 | Admin password ASCII character 7 | Admin password ASCII character 8 |
| 518 | Pass1 password ASCII character 1 | Pass1 password ASCII character 2 |
| 519 | Pass1 password ASCII character 3 | Pass1 password ASCII character 4 |
| 520 | Pass1 password ASCII character 5 | Pass1 password ASCII character 6 |
| 521 | Pass1 password ASCII character 7 | Pass1 password ASCII character 8 |
| 522 | Pass1 Password HTML Page Access Bitmap (Most Significant Word) | |
| 523 | Pass1 Password HTML Page Access Bitmap ($2^{nd}$ Most Significant Word) | |
| 524 | Pass1 Password HTML Page Access Bitmap ($2^{nd}$ Least Significant Word) | |
| 525 | Pass1 Password HTML Page Access Bitmap (Least Significant Word) | |
| 526 | Pass2 password ASCII character 1 | Pass2 password ASCII character 2 |
| 527 | Pass2 password ASCII character 3 | Pass2 password ASCII character 4 |
| 528 | Pass2 password ASCII character 5 | Pass2 password ASCII character 6 |
| 529 | Pass2 password ASCII character 7 | Pass2 password ASCII character 8 |
| 530 | Pass2 Password HTML Page Access Bitmap (Most Significant Word) | |
| 531 | Pass2 Password HTML Page Access Bitmap ($2^{nd}$ Most Significant Word) | |
| 532 | Pass2 Password HTML Page Access Bitmap ($2^{nd}$ Least Significant Word) | |
| 533 | Pass2 Password HTML Page Access Bitmap (Least Significant Word) | |
| 534 | Pass3 password ASCII character 1 | Pass3 password ASCII character 2 |
| 535 | Pass3 password ASCII character 3 | Pass3 password ASCII character 4 |
| 536 | Pass3 password ASCII character 5 | Pass3 password ASCII character 6 |
| 537 | Pass3 password ASCII character 7 | Pass3 password ASCII character 8 |
| 538 | Pass3 Password HTML Page Access Bitmap (Most Significant Word) | |
| 539 | Pass3 Password HTML Page Access Bitmap ($2^{nd}$ Most Significant Word) | |
| 540 | Pass3 Password HTML Page Access Bitmap ($2^{nd}$ Least Significant Word) | |
| 541 | Pass3 Password HTML Page Access Bitmap (Least Significant Word) | |
| 542 | RS485 Device Definitions - Protocol (3 = PowerLogic, 8 = Modbus) | RS485 Device Definitions - Address (0-254) |

TABLE 45-continued

ECC Register List

| Register | HiByte | LoByte |
|---|---|---|
| 543-604 | 62 more registers for up to 62 more Device definitions | |
| 605 | Number of viewable defined devices, includes CM that the ECC is attached to (1-62) | |
| 606 | Web Page Passwords Disabled (Most Significant Word) | |
| 607 | Web Page Passwords Disabled (Least Significant Word) | |
| 608 | MAC Address Byte 1 | MAC Address Byte 2 |
| 609 | MAC Address Byte 3 | MAC Address Byte 4 |
| 610 | MAC Address Byte 5 | MAC Address Byte 6 |
| 611 | Serial Number Byte 1 (32 bit number) | Serial Number Byte 2 |
| 612 | Serial Number Byte 3 | Serial Number Byte 4 |
| 613 | Model Number (16 bit number) | |
| 614 | Hardware Revision Number Character 1 | Hardware Revision Number Character 2 |
| 615 | Hardware Revision Number Character 3 | Hardware Revision Number Character 4 |
| 616 | Date of Manufacture Month Byte | Date of Manufacture Day Byte |
| 617 | Date of Manufacture Year Byte, since 1900 | Date of Manufacture Hour Byte |
| 618 | Date of Manufacture Minutes Byte | Date of Manufacture Seconds Byte |
| 619-638 | Scratch Pad/Process Area | |
| 639 | Firmware Version Number (2000 = 2.000) | |
| 640 | Refresh Rate for Static Tables in seconds (1-300) | |
| 641 | Force Manufacturing Parameters Flag (AAAA means the ECC excepts the manufacturing parameters from the register list) | |
| 642-991 | Reserved | |
| 992-998 | CM4 Ghost of registers 500-506 | |
| 999 | CM4 Ghost of CM4 RS485 port address | |

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A power monitoring system including multiple power monitoring devices; and an Ethernet communication device operative within at least a selected one of said power monitoring devices, said Ethernet communications device including:
   a pair of on-board Ethernet ports for connecting said Ethernet communication device and said selected power monitoring device to an Ethernet via either twisted pair wires or optical fiber, said Ethernet ports comprising a single physical interface chip capable of supporting dual physical Ethernet media types;
   an on-board serial port for connecting said Ethernet communication device and said selected power monitoring device to other power monitoring devices connected in a daisy chain;
   a processor coupled to both said Ethernet ports and to said serial port for controlling communications via said Ethernet ports and said serial port; and
   a Hypertext Transfer Protocol (HTTP) server operating on said processor for dynamically gathering, formatting and verifying real-time information from both said selected power monitoring device and said other power monitoring devices connected to said serial port in a daisy chain, for communicating with an internet browser, and for accessing Hypertext Markup Language (HTML) pages.

2. The system of claim 1 wherein said processor functions as both a master device and a slave device.

3. The system of claim 2 wherein said processor and said slave device are coupled, by said serial port, in a daisy chain and wherein said Ethernet communications device uses any of a plurality of protocols for either full duplex or half duplex communications, including SyMax, Modbus and Jbus.

4. The system of claim 1 wherein said HTTP server operates for sending data to a browser for dynamically formatting and verifying real-time data gathered by said processor and communications interfaces using JavaScript and VB script.

5. The system of claim 1, further including a web browser for accessing said HTTP server and at least one processor in communication with said HTTP server, said web browser generating a login, and said processor responding to said login by generating an access token for said web browser for permitting access by said web browser for a predetermined amount of time.

6. The system of claim 1 wherein said communication device comprises a fast Ethernet transceiver which provides a media independent interface for attachment to a 10/100 media access controller, and directly drives an RJ45 interface through magnetics and termination resistors and also provides a pseudo-ECL interface for use with 100Base Fx fast fiber transceivers.

7. An industrial power metering system comprising:
   multiple power monitoring devices; and
   an Ethernet communications device within at least a selected one of said power monitoring devices;
   said Ethernet communications device including
      a pair of on-board Ethernet ports for connecting said Ethernet communications device and said selected power monitoring device to an Ethernet via either twisted pair wires or optical fiber, an on-board serial port for connecting said communications device and said selected power monitoring device to other power monitoring devices connected in a daisy chain;

a processor coupled to both said Ethernet ports and to said serial port for controlling communications via said Ethernet ports and said serial pot; and a Hypertext Transfer Protocol (HTTP) server operating on said processor for dynamically gathering, formatting and verifying real-time information from both said selected power monitoring device and said other power monitoring devices connected to said serial port in a daisy chain, for communicating with an internet browser, and for accessing HTML pages, including custom HTML pages stored in the selected power monitoring device.

8. The system of claim 7 wherein said processor further functions as a slave device.

9. The system of claim 7 wherein said Ethernet communications device uses any of a plurality of protocols for either full duplex or half duplex communications, including SyMax, Modbus and Jbus.

10. The system of claim 7 wherein said HTTP server operates for sending data to a browser for dynamically formatting and verifying real-time data gathered by said processors and communications interfaces using JavaScript and VB script.

11. The system of claim 7 and further including a web browser accessing said HTTP server, said web browser generating a login, and said processor responding to said login by generating an access token for said web browser for permitting access by said web browser for a predetermined amount of time.

12. The system of claim 7 wherein said Ethernet ports comprise a single physical interface chip supporting dual physical Ethernet media types.

13. The system of claim 12 wherein said Ethernet ports comprise a fast Ethernet transceiver which provides a media independent interface for attachment to a 10/100 media access controller, and directly drives an RJ45 interface through magnetics and termination resistors and also provides a pseudo-ECL interface for use with 100Base Fx fast fiber transceivers.

14. An Ethernet communications method for a power monitoring system, said method comprising:

monitoring an electrical power distribution system with multiple power monitoring devices at least a selected one of which contains an Ethernet communications device having (1) a pair of on-board Ethernet ports for connecting said Ethernet communications device and said selected power monitoring device to an Ethernet via either twisted pair wires or optical fiber, (2) an on-board serial port for connecting said Ethernet communications device and said selected power monitoring device to other power monitoring devices connected in a daisy chain, and (3) a processor coupled to both said Ethernet ports and to said serial port for controlling communications via said Ethernet communication ports and said serial port;

dynamically gathering, formatting, verifying and communicating real-time information from both said selected power monitoring device and said other power monitoring devices connected to said serial port in a daisy chain, in a format useable by Hypertext Markup Language (HTML) pages, under the control of said processor and using a Hypertext Transfer Protocol (HTTP) server communicating through both said Ethernet ports and said serial port, accessing said HTTP server via a web browser and generating a login, said processor responding to said login by generating an access token for said web browser for permitting access by said web browser for a predetermined amount of time, and accessing HTML pages, including custom HTML pages stored in the selected power monitoring device, via said HTTP server.

15. The method of claim 14, in which information is gathered from said other power monitoring devices connected in a daisy chain, using any of a plurality of protocols for either full duplex or half duplex communications, including SyMax, Modbus and Jbus.

16. The method of claim 14 and further including dynamically formatting and verifying real-time data gathered by said gathering, using JavaScript and VB script.

17. The method of claim 14 including supporting dual physical Ethernet media types using a single physical interface chip.

18. The method of claim 17 including providing a media independent interface for attachment to a 10/100 media access controller, directly driving an RJ45 interface and providing a pseudo-ECL interface for use with 100Base Fx fast fiber transceivers.

19. An electrical power monitoring method comprising:

monitoring an electrical power distribution system with multiple power monitoring devices at least a selected one of which contains an Ethernet communications device having (1) a pair of on-board Ethernet ports for connecting said Ethernet communications device and said selected power monitoring device to an Ethernet via either twisted pair wires or optical fiber, said Ethernet ports comprising a single physical interface chip supporting dual physical Ethernet media types, (2) an on-board serial port for connecting said communications device and said selected power monitoring device to other power monitoring devices connected in a daisy chain, and (3) a processor coupled to both said Ethernet ports and to said serial port for controlling communications via Ethernet ports and said serial port; and dynamically gathering, formatting, verifying and communicating real-time information from both said selected power monitoring device and said other power monitoring devices connected to said serial port in a daisy chain, in a format usable by HTML pages, under the control of said processor and using a Hypertext Transfer Protocol (HTTP) server communicating through both said Ethernet ports and said serial port.

20. The method of claim 19 in which information is gathered from said other power monitoring devices connected in a daisy chain, using any of a plurality of protocols for either full duplex or half duplex communications, including SyMax, Modbus and Jbus.

21. The method of claim 19 and further including dynamically formatting and verifying real-time data gathered by said gathering, using JavaScript and VB script.

22. The method of claim 19, in which said HTTP server is accessed from a web browser, said web browser generating a login, and said HTTP server responding to said login by generating an access token for said web browser for permitting access by said web browser for a predetermined amount of time.

23. The method of claim 19 including supporting dual physical Ethernet media types using a single physical interface chip.

24. The method of claim 23 including providing a media independent interface for attachment to a 10/100 media access controller, directly driving an RJ45 interface and providing a pseudo-ECL interface for use with 100Base Fx fast fiber transceivers.

25. An Ethernet communications card apparatus for a power monitoring system that includes multiple power monitoring devices, said Ethernet communications card being insertable within at least a selected one of said power monitoring devices and comprising:

a pair of on-board Ethernet ports for connecting said Ethernet communications device and said selected power monitoring device to an Ethernet via either twisted pair wires or optical fiber, said Ethernet ports comprising a single physical interface chip supporting dual physical Ethernet media types, and including a fast Ethernet transceiver which provides a media independent interface for attachment to a 10/100 media access controller, and directly drives an RJ45 interface through magnetics and termination resistors and also provides a pseudo-ECL interface for use with 100Base Fx fast fiber transceivers;

an on-board serial port for connecting said Ethernet communications device and said selected power monitoring device to other power monitoring devices connected in a daisy chain;

a processor coupled to both said Ethernet ports and to said serial port for controlling communications via said Ethernet ports and said serial port;

a Hypertext Transfer Protocol (HTTP) server operating on said processor for dynamically gathering, formatting and verifying real-time information from both said selected power monitoring device and said other power monitoring devices connected to said serial port in a daisy chain, for communicating with an internet browser, and for accessing HTML pages, including custom HTML pages stored in the selected power monitoring device, said Ethernet communications device using any of a plurality of protocols for either full duplex or half duplex communications, including SyMax, Modbus and Thus, said HTTP server operates for sending data to a browser for dynamically formatting and verifying real-time data using JavaScript and VB script; and a web browser for accessing said HTTP server and generating a login, and said processor responding to said login by generating an access token for said web browser for permitting access by said web browser for a predetermined amount of time.

* * * * *